(12) United States Patent
Fu et al.

(10) Patent No.: US 12,445,687 B1
(45) Date of Patent: Oct. 14, 2025

(54) SUPPLEMENTAL CONTENT RECOMMENDER

(71) Applicant: Amazon Technologies, Inc., Seattle, WA (US)

(72) Inventors: Yan Fu, Bellevue, WA (US); Sunny Chiu Webster, Woodinville, WA (US); Kellen Gillespie, Bellevue, WA (US); Zeynabalsadat Raeesy, Seattle, WA (US); Qian You, Bellevue, WA (US); Yao Zhang, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 39 days.

(21) Appl. No.: 18/609,541

(22) Filed: Mar. 19, 2024

(51) Int. Cl.
*H04N 21/478* (2011.01)
*G10L 15/22* (2006.01)
*H04W 8/18* (2009.01)

(52) U.S. Cl.
CPC .......... *H04N 21/478* (2013.01); *G10L 15/22* (2013.01); *H04W 8/18* (2013.01)

(58) Field of Classification Search
None
See application file for complete search history.

(56) References Cited

U.S. PATENT DOCUMENTS

| | | | |
|---|---|---|---|
| 6,415,257 B1 | 7/2002 | Junqua et al. | |
| 6,795,808 B1 | 9/2004 | Strubbe et al. | |
| 6,853,982 B2 | 2/2005 | Smith et al. | |
| 6,901,366 B1 | 5/2005 | Kuhn et al. | |
| 7,555,529 B2 | 6/2009 | Bloomfield et al. | |
| 7,925,649 B2 | 4/2011 | Jeh et al. | |
| 8,644,675 B2 | 2/2014 | McDermott et al. | |
| 8,842,967 B2 | 9/2014 | McDermott et al. | |

(Continued)

FOREIGN PATENT DOCUMENTS

| | | |
|---|---|---|
| CN | 115244617 A | 10/2022 |
| DE | 112021000291 T5 | 10/2022 |

(Continued)

OTHER PUBLICATIONS

International Search Report and Written Opinion issued Apr. 22, 2021 for International Patent Application No. PCT/US2021/012144.

(Continued)

*Primary Examiner* — Omar S Parra
(74) *Attorney, Agent, or Firm* — Pierce Atwood LLP

(57) ABSTRACT

Techniques for determining supplemental content of potential interest to a user are described. A system may receive system usage data of a user and supplemental content presentation data including supplemental content and indicating how it is to be presented. The system may determine first embedding data representing the system usage data and second embedding data representing the supplemental content presentation data. The system may receive dialog data including a user input and a system response to the user input. The system may determine, using a language model, third embedding data representing the user input, fourth embedding data representing the system response, and fifth embedding data representing the supplemental content. The system may determine a pairwise dot product using the first through fifth embedding data, and may process, using a neural network, the pairwise dot product to determine the supplemental content is to be presented.

20 Claims, 12 Drawing Sheets

(56) References Cited

U.S. PATENT DOCUMENTS

| | | |
|---|---|---|
| 8,949,722 B2 | 2/2015 | Sirpal et al. |
| 9,224,127 B2 | 12/2015 | Nielsen et al. |
| 9,286,910 B1 | 3/2016 | Li et al. |
| 9,318,108 B2 | 4/2016 | Gruber et al. |
| 9,378,740 B1 | 6/2016 | Rosen et al. |
| 9,465,875 B2 | 10/2016 | Barkol et al. |
| 9,483,159 B2 | 11/2016 | Myslinski |
| 9,493,130 B2 | 11/2016 | Penilla et al. |
| 9,502,025 B2 | 11/2016 | Kennewick et al. |
| 9,571,645 B2 | 2/2017 | Quast et al. |
| 9,576,574 B2 | 2/2017 | van Os |
| 9,646,313 B2 | 5/2017 | Kim et al. |
| 9,679,067 B2 | 6/2017 | Badros et al. |
| 9,691,384 B1 | 6/2017 | Wang et al. |
| 9,736,519 B2 | 8/2017 | Balakrishnan et al. |
| 9,774,979 B1 | 9/2017 | Morishita et al. |
| 9,875,477 B2 | 1/2018 | Glore |
| 10,057,736 B2 | 8/2018 | Gruber et al. |
| 10,074,364 B1 | 9/2018 | Wightman et al. |
| 10,163,074 B2 | 12/2018 | Wilkerson |
| 10,241,752 B2 | 3/2019 | Lemay et al. |
| 10,268,680 B2 | 4/2019 | Takiel |
| 10,319,375 B2 | 6/2019 | Fritz et al. |
| 10,347,247 B2 | 7/2019 | Bhaya et al. |
| 10,402,450 B2 | 9/2019 | Goodman et al. |
| 10,453,453 B2 | 10/2019 | Penilla et al. |
| 10,460,734 B2 | 10/2019 | Jones et al. |
| 10,470,020 B2 | 11/2019 | Lockenour |
| 10,482,904 B1 | 11/2019 | Hardie et al. |
| 10,636,418 B2 | 4/2020 | Badr et al. |
| 10,652,622 B2 | 5/2020 | Wu et al. |
| 10,679,250 B2 | 6/2020 | Pattan et al. |
| 10,721,356 B2 | 7/2020 | Segalis et al. |
| 10,726,452 B2 | 7/2020 | Brown et al. |
| 10,878,047 B1 | 12/2020 | Mutagi et al. |
| 10,909,990 B2 | 2/2021 | Jones et al. |
| 11,037,558 B2 | 6/2021 | Trim et al. |
| 11,064,339 B2 | 7/2021 | Namre et al. |
| 11,113,717 B2 | 9/2021 | Kohareswaran et al. |
| 11,120,372 B2 | 9/2021 | Gruber et al. |
| 11,140,116 B2 | 10/2021 | Laller |
| 11,195,534 B1 | 12/2021 | Shen et al. |
| 11,228,451 B2 | 1/2022 | Robert et al. |
| 11,231,975 B2 | 1/2022 | Chalmers et al. |
| 11,250,218 B2 | 2/2022 | Sarikaya et al. |
| 11,269,812 B2 | 3/2022 | Fox et al. |
| 11,270,699 B2 | 3/2022 | Penilla et al. |
| 11,322,150 B2 | 5/2022 | Nadig et al. |
| 11,334,383 B2 | 5/2022 | Rakshit et al. |
| 11,398,231 B2 | 7/2022 | Goodman |
| 11,443,740 B1 | 9/2022 | Ravu et al. |
| 11,455,996 B2 | 9/2022 | Carbune et al. |
| 11,490,240 B2 | 11/2022 | Lu et al. |
| 11,531,940 B2 | 12/2022 | Gupta et al. |
| 11,580,182 B2 | 2/2023 | Mutagi et al. |
| 11,631,015 B2 | 4/2023 | Matlick et al. |
| 11,657,095 B1 | 5/2023 | Wu et al. |
| 11,734,026 B2 | 8/2023 | Penilla et al. |
| 11,783,828 B2 | 10/2023 | Sharifi et al. |
| 11,797,629 B2 | 10/2023 | Mutagi et al. |
| 11,869,495 B2 | 1/2024 | Kapila et al. |
| 11,893,996 B1 | 2/2024 | Kockerbeck et al. |
| 11,908,468 B2 | 2/2024 | Krishnan et al. |
| 11,929,069 B2 | 3/2024 | Vuskovic et al. |
| 2011/0106633 A1 | 5/2011 | Cook |
| 2011/0270517 A1 | 11/2011 | Benedetti |
| 2013/0263182 A1 | 10/2013 | Ivy et al. |
| 2013/0339146 A1 | 12/2013 | Goldberg et al. |
| 2014/0218372 A1 | 8/2014 | Missig et al. |
| 2014/0282153 A1 | 9/2014 | Christiansen et al. |
| 2014/0337424 A1 | 11/2014 | Lee et al. |
| 2015/0160817 A1 | 6/2015 | Hwang et al. |
| 2015/0193379 A1 | 7/2015 | Mehta |
| 2015/0312632 A1 | 10/2015 | Hoctor et al. |
| 2016/0070449 A1 | 3/2016 | Christiansen et al. |
| 2016/0171979 A1 | 6/2016 | Breazeal et al. |
| 2017/0068987 A1 | 3/2017 | Levinson et al. |
| 2017/0099592 A1 | 4/2017 | Loeb et al. |
| 2017/0149716 A1 | 5/2017 | Mostachetti et al. |
| 2017/0186029 A1 | 6/2017 | Morris et al. |
| 2017/0206064 A1 | 7/2017 | Breazeal et al. |
| 2017/0293615 A1 | 10/2017 | Peterson et al. |
| 2018/0020093 A1 | 1/2018 | Bentitou et al. |
| 2018/0367862 A1 | 12/2018 | Horii et al. |
| 2020/0126533 A1 | 4/2020 | Doyle et al. |
| 2020/0185078 A1 | 6/2020 | Pauws et al. |
| 2020/0211553 A1 | 7/2020 | Bohl et al. |
| 2020/0243178 A1 | 7/2020 | Sweeney |
| 2021/0073661 A1 | 3/2021 | Matlick et al. |
| 2021/0117003 A1 | 4/2021 | Deisher et al. |
| 2021/0149944 A1 | 5/2021 | Case et al. |
| 2022/0108693 A1 | 4/2022 | Maeda et al. |
| 2022/0358930 A1 | 11/2022 | Nadig et al. |
| 2023/0290351 A1 | 9/2023 | Sindhwani |

FOREIGN PATENT DOCUMENTS

| | | |
|---|---|---|
| GB | 2607806 A | 12/2022 |
| WO | 2021154462 A1 | 8/2021 |

OTHER PUBLICATIONS

International Preliminary Report on Patentability mailed on Aug. 11, 2022 for International Patent Application No. PCT/US2021/012144.

Mike Arsenault. "How to Measure The True Profitability of Your Email Campaigns Using Holdout Tests," last accessed on Dec. 17, 2019, pp. 1-7, https://rejoiner.com/resources/measure-true-profilitability-email-campaigns-using-holdout-tests/.

Udit Gupta, et al. "The Architectural Implications of Facebook's DNN-based Personalized Recommendation," https://arxiv.org/pdf/1906.03109.pdf, Feb. 15, 2020, 14 pages.

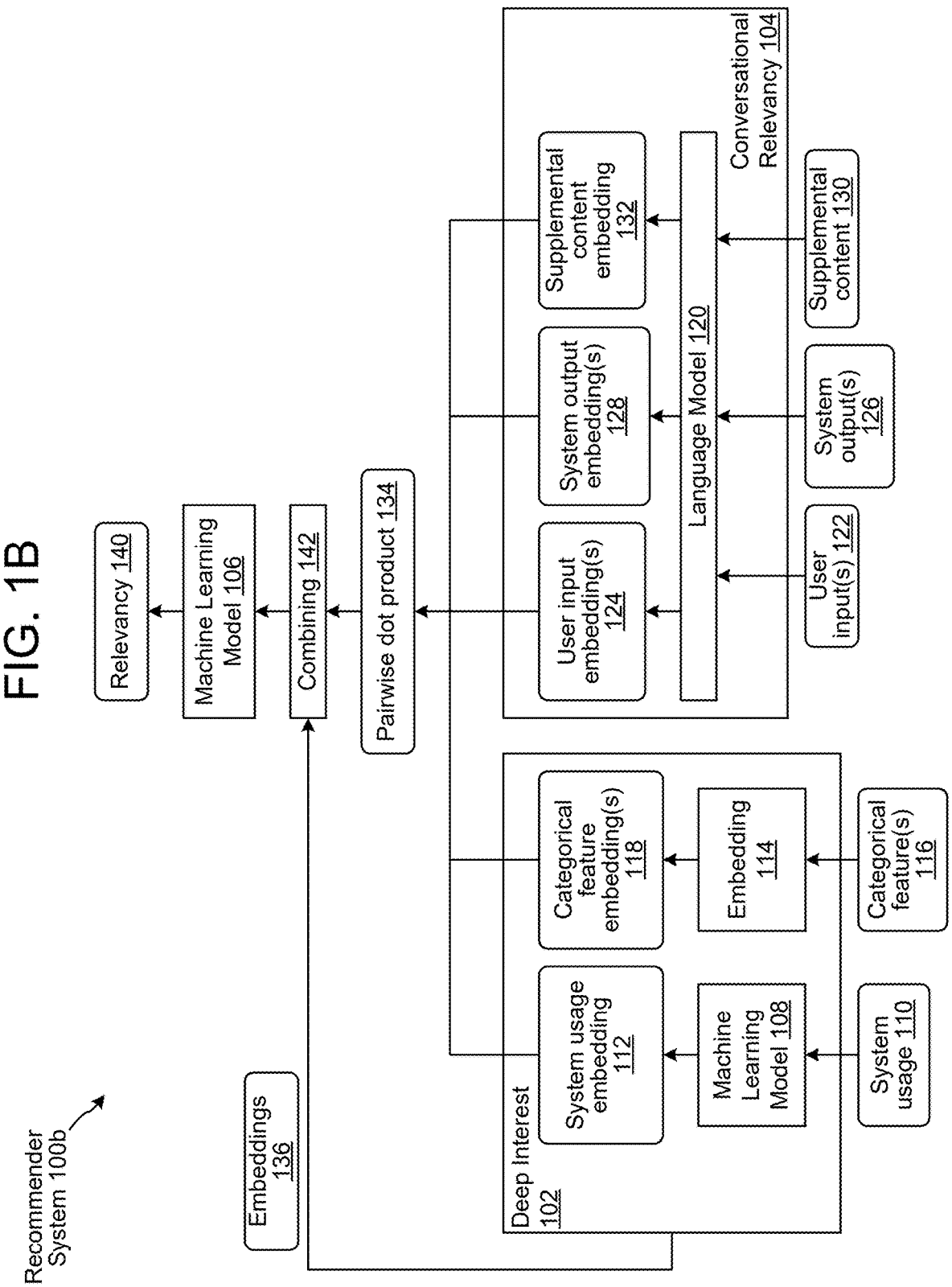

SUPPLEMENTAL CONTENT RECOMMENDER

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Such processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1B is a conceptual diagram illustrating another example recommender system, according to embodiments of the present disclosure.

DETAILED DESCRIPTION

Figure 1A:
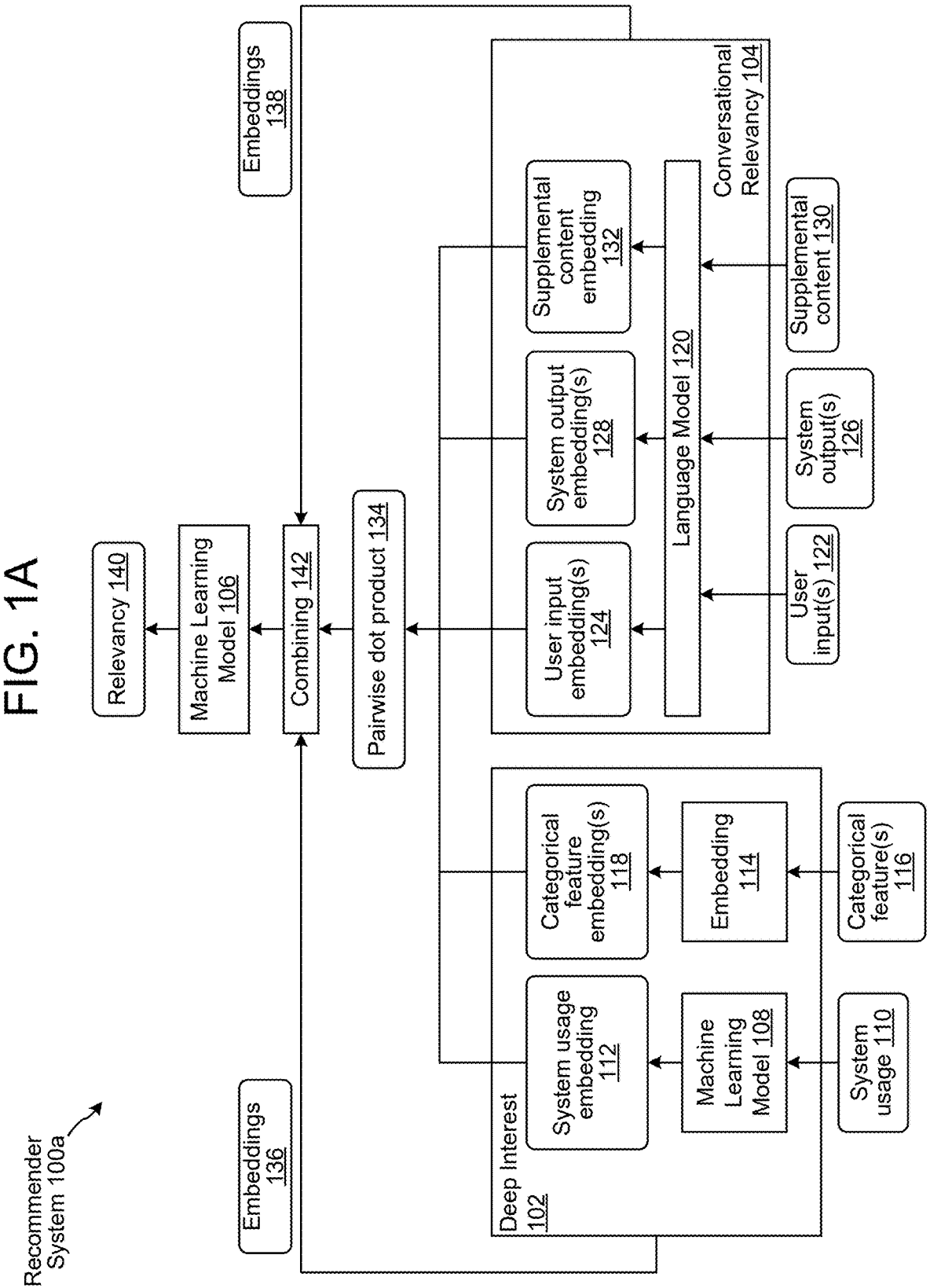
FIG. 1A is a conceptual diagram illustrating an example recommender system, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech. Natural language generation (NLG) is a field of artificial intelligence concerned with automatically transforming data into natural language (e.g., English) content. Speech-to-speech is a field of computer science, artificial intelligence, and linguistics in which embedding data is generated to represent speech in audio data and, using one or more models, the embedding data is processed to generate audio data and/or a system (e.g., API) command responsive to the speech. Language modeling (LM) is the use of various statistical and probabilistic techniques to determine the probability of a given sequence of words occurring in a sentence. LM can be used to perform various tasks including understanding a natural language input (e.g., when noise is present) and performing generative tasks that involve generating natural language output data.

Certain systems may be configured to respond to natural language (e.g., spoken or typed) user inputs. For example, in response to the user input "what is today's weather," the system may output weather information for the user's geographic location. As another example, in response to the user input "what are today's top stories," the system may output one or more news stories. For further example, in response to the user input "tell me a joke," the system may output a joke to the user.

Certain systems may further recommend supplemental content to users as well as offer the users an interactive experience to search and navigate recommended supplemental content. As used herein, "supplemental content" refers to content that may not be expressly requested by the user but may, in any event, be of interest to a user and may be presented to extend a user-system dialog. For instance, when a user asks for a seafood recipe around dinner time, a system may integrate conversation topics, time, and location to curate a list of items like recipes, nutritional facts, cooking tips, nearby grocery stores, nearby sales/discounts on certain items, and nearby seafood restaurants to present to the user as supplemental content. As a further example, if a user asks about the local weather, the system may output a weather forecast and may extend the conversation with supplemental content, which could range from audio or visual materials related to weather, useful tips, or other topics of potential interest to the user, such as air quality or humidity.

As used herein, a "dialog" refers to an exchange of related user inputs and system-generated responses. A dialog may be goal-oriented, meaning the dialog is directed to the performance of a specific action (e.g., figuring out what music the system should play). A user input and performance of a corresponding action (i.e., a system-generated response) may be referred to as a dialog "turn." A dialog identifier may be associated with multiple related turns. Each turn may be associated with a respective turn identifier. One user input may be considered related to a subsequent user input, thereby causing a single dialog identifier to be associated with both user inputs. A first user input may be considered related to a second (subsequent) user input based on, for example, a length of time between receipt of the first and second user inputs, a length of time between performance of a system-generated response to the first user input and receipt of the second user input, the substances of the first and second user inputs, and/or the substances of the second user input and the system-generated response to the first user input. In some embodiments, a system may output supplemental content upon determining, or otherwise being notified that, a dialog has ended.

A system may use various natural language processing techniques in processing user requests, understanding semantic nuances, and evaluating conversational relevance. The advent of language models (e.g., large language models) has further augmented these capabilities, providing an enhanced level of system interaction and understanding.

Despite these advancements, integrating user profiles (e.g., long-term engagement and interest topics) and personalized interests with conversational relevance (e.g., current topic) to achieve a more customized recommendation experience (e.g., to present supplemental content of interest to the user) remains a relatively unexplored area.

The present disclosure provides techniques for determining supplemental content of potential interest to a user. Embodiments of the present disclosure utilize a dual deep learning recommender system that integrates user personalization with conversational relevancy. Recommender systems of the present disclosure represent an advancement in recommender systems by integrating deep learning techniques with language models (e.g., large language models). The techniques of the present disclosure allow for a dynamic conversation-based recommendation process, offering a more personalized user experience.

A recommender system of the present disclosure may include a deep interest component and a conversational relevancy component. The deep interest component may utilize deep learning to analyze a user's system usage and preferences. At least partially in parallel, the conversational relevancy component may leverage a language model to process a user-system dialog in real-time to ensure relevance of supplemental content to a current conversational context. The outputs of both components may be processed using a deep learning recommender system to learn similarities among dialogs, supplemental content, and user interests, and leverage same for assessing whether specific supplemental content should be presented.

The present disclosure provides a computer-implemented method including (and a computing system configured to) receiving system usage data associated with a user identifier, the system usage data being based on past system interactions associated with the user identifier; receiving supplemental content presentation data including supplemental content and indicating how the supplemental content is to be presented; determining first embedding data representing the system usage data; determining second embedding data representing the supplemental content presentation data; receiving dialog data associated with the user identifier, the dialog data comprising a user input and a system response to the user input; receiving supplemental content data corresponding to the supplemental content; determining, using a language model, third embedding data representing the user input; determining, using the language model, fourth embedding data representing the system response; determining, using the language model, fifth embedding data representing the supplemental content data; determining a pairwise dot product using the first embedding data, the second embedding data, the third embedding data, the fourth embedding data, and the fifth embedding data; generating model input data by concatenating the pairwise dot product with the first embedding data, the second embedding data, the third embedding data, the fourth embedding data, and the fifth embedding data; processing, using a second model, the model input data to determine the supplemental content is to be presented; and presenting the supplemental content.

In some embodiments, receiving the system usage data comprises one or more of: receiving conversion data representing when past supplemental content was presented using the user identifier and resulted in a subsequent user input relating to the past supplemental content; receiving subscription data representing the user identifier is associated with one or more subscriptions to access system functionality; and receiving domain affinity data representing a user preference for a domain, corresponding to the supplemental content, based on past user inputs associated with the user identifier.

In some embodiments, the computer-implemented method further includes (or the computing system is further configured to) receiving time data representing a present time; receiving device type data corresponding to a device to be used to present the supplemental content; determining sixth embedding data representing the time data; determining seventh embedding data representing the device type data; and determining the pairwise dot product further using the sixth embedding data and the seventh embedding data.

In some embodiments, the system usage data is represented as numerical values; and determining the first embedding data comprises processing the numerical values using a multilayer perceptron network.

The present disclosure also provides a computer-implemented method including (and a computing system configured to) receiving usage data associated with a user identifier; receiving supplemental data including supplemental content and indicating how the supplemental content is to be presented; determining first embedding data representing the usage data; determining second embedding data representing the supplemental data; receiving input data associated with the user identifier, the input data representing a user input; receiving response data representing a system response to the user input; receiving supplemental content data corresponding to the supplemental content; determining, using a language model, third embedding data representing the input data; determining, using the language model, fourth embedding data representing the response data; determining, using the language model, fifth embedding data representing the supplemental content data; determining model input data using the first embedding data, the second embedding data, the third embedding data, the fourth embedding data, and the fifth embedding data; processing, using a second model, the model input data to determine the supplemental content is to be presented; and presenting the supplemental content.

In some embodiments, the computer-implemented method further includes (or the computing system is further configured to) determining a pairwise dot product using the first embedding data, the second embedding data, the third embedding data, the fourth embedding data, and the fifth embedding data; and generating the model input data using the pairwise dot product, the first embedding data, and the second embedding data.

In some embodiments, the computer-implemented method further includes (or the computing system is further configured to) determining a pairwise dot product using the first embedding data, the second embedding data, the third embedding data, the fourth embedding data, and the fifth embedding data; and generating the model input data using the pairwise dot product, the third embedding data, the fourth embedding data, and the fifth embedding data.

In some embodiments, the computer-implemented method further includes (or the computing system is further configured to) determining a pairwise dot product using the first embedding data, the second embedding data, the third embedding data, the fourth embedding data, and the fifth embedding data; and generating the model input data using the pairwise dot product, the first embedding data, the second embedding data, the third embedding data, the fourth embedding data, and the fifth embedding data.

In some embodiments, receiving the system usage data comprises one or more of: receiving conversion data representing when past supplemental content was presented using the user identifier and resulted in a subsequent user input relating to the past supplemental content; receiving subscription data representing the user identifier is associated with one or more subscriptions to access system functionality; and receiving domain affinity data representing a user preference for a domain, corresponding to the supplemental content, based on past user inputs associated with the user identifier.

In some embodiments, the computer-implemented method further includes (or the computing system is further configured to) receiving time data representing a present time; determining sixth embedding data representing the time data; and determining the model input data further using the sixth embedding data.

In some embodiments, the computer-implemented method further includes (or the computing system is further configured to) receiving device type data corresponding to a device to be used to present the supplemental content; determining sixth embedding data representing the device type data; and determining the model input data further using the sixth embedding data.

In some embodiments, the usage data is represented as numerical values; and determining the first embedding data comprises processing the numerical values using a multi-layer perceptron network.

Teachings of the present disclosure result, among other things, in an improved user experience as the present disclosure enables a system to present supplemental content that is likely of interest to the user.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A illustrates an example recommender system 100a according to embodiments of the present disclosure. A system may store multiple different instances of supplemental content for presentation to users of the system. The different instances of supplemental content may be provided by one or more supplemental content providers. The recommender system 100a may perform the processing, described with respect to FIG. 1A below, with respect to a single instance of supplemental content. Thus, when the recommender system 100a is to determine supplemental content for presentation to a user, the recommender system 100a may execute more than once, with each instance of processing being with respect to a different instance of supplemental content capable of being output by the system. In some embodiments, the recommender system 100a may process n times, where n corresponds to the number of instances of supplemental content capable of being output by the system.

The recommender system 100a may include a deep interest component 102, a conversational relevancy component 104, and a machine learning model 106.

The deep interest component 102 is configured to evaluate the user's past user-system interactions for user interests. The deep interest component 102 may include a machine learning model 108 that receives system usage data 110 and is trained to generate system usage embedding 112, representing the system usage data 110. The system usage data 110 may be associated with a user identifier of the user of the system.

In some embodiments, the machine learning model 108 may be a neural network. In some embodiments, the machine learning model 108 may include one or more feedforward layers. In some embodiments, the machine learning model 108 may be a multilayer perceptron model, which is a fully connected feed-forward neural network with at least three layers (i.e., an input layer, an output layer, and at least one hidden layer). In a multilayer perceptron model, the required task is performed by the output layer. An arbitrary number of hidden layers that are placed in between the input and output layer are the computational engine of the multilayer perceptron model. Similar to a feed forward network, in a multilayer perceptron model the data flows in the forward direction from input to output layer. The neurons in the multilayer perceptron model may be trained with a back propagation learning algorithm.

When the system presents supplemental content to a user, the user's reaction to the supplemental content (i.e., whether the user provides a subsequent user input relating to the supplemental content) may be stored by the system in association with the user's identifier, a supplemental content provider identifier associated with the provider of the supplemental content, and/or a domain identifier corresponding to a domain of the supplemental content.

As used herein, a "domain" refers to a collection of related functionality. A non-limiting list of domains includes a smart home domain (corresponding to smart home functionality), a music domain (corresponding to music functionality), a video domain (corresponding to video functionality), a weather domain (corresponding to weather functionality), a communications domain (corresponding to one- and/or two-way communications functionality), a payments domain (corresponding to payment functionality), an information domain (corresponding to information functionality, and a shopping domain (corresponding to shopping functionality).

The system usage data 110 may include conversion data representing when supplemental content was presented to the user (i.e., using the user identifier) in the past and resulted in further user engagement (i.e., resulted in the system receiving, from the user, a subsequent user input relating to the supplemental content). The conversion data may indicate a number of times the user has provided subsequent user inputs relating to presented supplemental content.

Additionally or alternatively, the conversion data may indicate a rate (e.g., number of times per time period) at which the user has provided subsequent user inputs relating to presented supplemental content. In some embodiments, the conversion data may be specific to the domain or provider of the supplemental content with respect to which the recommender system 100a is presently processing.

The system usage data 110 may additionally or alternatively include demographic data representing the user's usage of the system. The demographic data may include subscription data indicating whether the user subscribes to (i.e., the user identifier of the user is associated with) one or more specific system functionalities that are not accessible without a subscription. For example, the system may implement music functionality that is only accessible to a user that subscribes to the music functionality. The demographic data may additionally or alternatively include data indicating whether the user interacts with the system with respect to one or more specific domains (e.g., smart home).

The system may include a model that processes the user's overall system usage to assess the user's affinity at the domain and/or supplemental content provider level. The model may represent the user's affinity for a given domain (or supplemental content provider) in the form of a number of times the user has engaged the system with respect to the domain (or supplemental content provider) and/or a rate (e.g., number of times per time period) at which the user has engaged the system with respect to the domain (or supplemental content provider). The system usage data 110 may include domain affinity data representing a portion of the foregoing model's output associated with the user's identifier and which is specific to the domain (or provider) of the supplemental content with respect to which the recommender system 100*a* is presently processing.

In some embodiments, each of the different portions of the system usage data 110 may be represented as numerical values. For example, a numerical value may be on a scale of 0 (low affinity) to 10 or some other number (high affinity), or a numerical value may correspond to a number of times the user has provided a user input corresponding a domain.

The machine learning model 108 may process the system usage data 110 to determine system usage embedding 112. The system usage embedding 112 may be a representation of the system usage data 110 (e.g., features-based representation, encoded representation, machine-generated representation, etc.).

The deep interest component 102 may also include an embedding component 114 that maps a categorical feature(s) 116 to a categorical feature embedding(s) 118 of the same size as the system usage embedding 112. Alternatively, the deep interest component 102 may not include the embedding component 114 and, instead, may receive the categorical feature embedding(s) 118.

The system may store, or a supplemental content provider may provide, supplemental content presentation data including supplemental content (e.g., text data, image data, audio data, etc.) and indicating how the supplemental content is to be presented (e.g., as synthesized speech, as visual content, or as synthesized speech and visual content). The categorical feature(s) 116 may include supplemental content presentation data corresponding to the supplemental content with respect to which the recommender system 100*a* is presently processing.

The categorical feature(s) 116 may additionally or alternatively include an identifier of the supplemental content provider of the supplemental content with respect to which the recommender system 100*a* is presently processing. The supplemental content provider identifier may be a name of the provider or some other unique identifier (e.g., an alphanumeric identifier).

An instance of supplemental content may be associated with a trigger intent (i.e., an intent that, when representative of a user input provided during a dialog with the system, causes the associated supplemental content to become potentially of interest to the user). Example intents include, but are not limited to, "play music," "output video," "get weather forecast," "purchase," "question and answering," "set notification," "turn on appliance," "turn off appliance," "add to list," and "set reminder." The categorical feature(s) 116 may include the trigger intent associated with the supplemental content with respect to which the recommender system 100*a* is presently processing.

An instance of supplemental content may be associated with a suggested intent (i.e., an intent representative of system functionality recommended by the supplemental content). The categorical feature(s) 116 may include the suggested intent associated with the supplemental content with respect to which the recommender system 100*a* is presently processing.

The categorical feature(s) 116 may include time data representing a present time. The present time may be represented as a time of day and/or a day of the week and/or a month of the year, etc. A user may have different affinities for the presentation of supplemental content based on the time of day and/or a day of the week and/or a month of the year, etc. Including the time data in the categorical feature(s) 116 can assist the recommender system 100*a* in evaluating whether the user has affinity for supplemental content being output at the present time.

The categorical feature(s) 116 may include device type data representing a type of the device to be used to present the supplemental content to the user. Example device types include, but are not limited to, devices having at least one speaker but not display, devices having a display but no speakers, and devices having both at least one speaker and a display. Device type, in conjunction with supplemental content presentation data, may be useful in the recommender system 100*a* evaluating whether the supplemental content should be presented using the device and as indicated in the supplemental content presentation data.

The categorical feature(s) 116 may additionally or alternatively indicate the domains and/or intents of the user's previous user inputs. The indicated domains and/or intents may not be limited to the domain(s) and/or intent(s) of the user's input(s) of the user's most recent user-system dialog.

The embedding component 114 may generate a different categorical feature embedding 118 for each categorical feature 116 received. The embedding component 114 may be a machine learning model, an encoder, etc. The categorical feature embedding 118 may be a representation of the categorical feature 116 (e.g., features-based representation, encoded representation, machine-generated representation, etc.).

The conversational relevancy component 104 may include a language model 120 trained to encode portions of dialogs (e.g., user inputs and corresponding system outputs) as well as the supplemental content (with respect to which the recommender system 100*a* is presently processing) into embeddings having the same dimension as the system usage embedding 112 and the categorical feature embedding(s) 118. In some embodiments, the language model 120 may generate compressed representation word embeddings. In some embodiments, the language model 120 may be a large language model. In some embodiments, the language model 120 may be a Bidirectional Encoder Representations from Transformers (BERT) model. In some embodiments, the language model 120 may be a Sentence-BERT (sBERT) model.

The language model 120 may receive a user input(s) 122 (e.g., in the form of natural language text data) included in the instant or most recent user-system dialog of the user (associated with the user's identifier). In some embodiments, the language model 120 may receive only the last user input of the dialog. In other embodiments, the language model 120 may receive more than one user input of the dialog (e.g., the first and last user inputs of the dialog, all the user inputs of the dialog, or some other portion of the dialog's user inputs). The language model 120 may generate a user input embedding(s) 124 representing the user input(s) 122. The language model 120 may generate a different user input embedding 124 for each user input 122 received. Each user input embedding 124 may have the same dimension as the system usage embedding 112 and the categorical feature embedding(s) 118.

The language model 120 may receive a system output(s) 126 (e.g., in the form of natural language text data) included in the instant or most recent user-system dialog of the user (associated with the user's identifier). In some embodiments, the language model 120 may receive only the last system output of the dialog. In other embodiments, the language model 120 may receive more than one system output of the dialog (e.g., the first and last system outputs of the dialog, all the system outputs of the dialog, or some other portion of the dialog's system outputs). The language model 120 may generate a system output embedding(s) 128 representing the system output(s) 126. The language model 120 may generate a different system output embedding 128 for each system output 126 received. Each system output embedding 128 may have the same dimension as the system usage embedding 112 and the categorical feature embedding(s) 118.

The language model 120 may receive the supplemental content 130 (e.g., in the form of natural language text data) with respect to which the recommender system 100a is presently processing. The language model 120 may generate a supplemental content embedding 132 representing the supplemental content 130. The supplemental content embedding 132 may have the same dimension as the system usage embedding 112 and the categorical feature embedding(s) 118.

In some embodiments, the language model 120 may generate the user input embedding(s) 124, system output embedding(s) 128, and supplemental content embedding 132 to have a dimension greater than that of the system usage embedding 112 and the categorical feature embedding(s) 118. In such embodiments, the user input embedding(s) 124, system output embedding(s) 128, and supplemental content embedding 132 may undergo compression so they have the same dimension as the system usage embedding 112 and the categorical feature embedding(s) 118.

The recommender system 100a may generate a pairwise dot product 134 using the system usage embedding 112, categorical feature embedding(s) 118, user input embedding(s) 124, system output embedding(s) 128, and supplemental content embedding 132. In some embodiments, the deep interest component 102 may generate a pairwise dot product using the system usage embedding 112 and categorical feature embedding(s) 118; the conversational relevancy component 104 may generate a pairwise dot product using the user input embedding(s) 124, system output embedding(s) 128, and supplemental content embedding 132; and the recommender system 100a may generate the pairwise dot product 134 using the pairwise dot products individually generated by the deep interest component 102 and conversational relevancy component 104. Such embodiments may enable the deep interest component 102 to determine correlations between the system usage embedding 112 and the categorical feature embedding(s) 118, and may enable the conversational relevancy component 104 to determine correlations (i.e., conversational relevancy) between the user input embedding(s) 124, system output embedding(s) 128, and supplemental content embedding 132.

The recommender system 100a may include a combining component 142 that generates model input data by combining (e.g., concatenating) the pairwise dot product 134 with the system usage embedding 112 and categorical feature embedding(s) 118 (collectively illustrated in FIG. 1A as embeddings 136), and the user input embedding(s) 124, system output embedding(s) 128, and supplemental content embedding 132 (collectively illustrated in FIG. 1A as embeddings 138). Such combining may be done to emphasize the importance of the user's "deep interests" and conversational relevancy.

The model input data is input to the machine learning model 106 trained to determine relevancy data 140 indicating a likelihood (e.g., a confidence score, a probability, etc.) that the supplemental content (with respect to which the recommender system 100a is presently processing) is to be presented to the user. The relevancy data 140, in some cases, may represent how relevant the supplement content (represented in the supplement content embedding 132) is to the user based at least on the user's interests and the current conversation topic(s). The relevancy data 140 may be a numerical value representing the likelihood. In some embodiments, the relevancy data 140 may be a Boolean value (e.g., "yes" or "no"; "true" or "false"; etc.) representing whether or not the corresponding supplemental content is to be presented to the user.

In some embodiments, the machine learning model 106 may be a neural network. In some embodiments, the machine learning model 106 may include one or more feedforward layers. In some embodiments, the machine learning model 106 may be a multilayer perceptron model.

In embodiments where the user input embedding(s) 124, system output embedding(s) 128, and supplemental content embedding 132 undergo compression to get to the same dimension as the system usage embedding 112 and the categorical feature embedding(s) 118, the pairwise dot product of the user input embedding(s) 124, system output embedding(s) 128, and supplemental content embedding 132 may be input to the machine learning model 106 to make up for information loss during compression.

The recommender system 100a may process, as described herein above, with respect to different supplemental content candidates, thereby generating corresponding relevancy data 140 for each supplemental content candidate.

In some embodiments, the system may apply a deterministic selection process to select a single supplemental content candidate for presentation. In other words, the system may select, for presentation, the supplemental content candidate associated with the top (or bottom depending on how the machine learning model 106 is configured) scored relevancy data 140.

In other embodiments, the system may implement a probabilistic selection process. For example, the system may apply a softmax layer to project the scores in the relevancy data 140 into a probability space, and select a supplemental content candidate based on the probability.

FIG. 1B illustrates a recommender system 100b. The recommender system 100b may be the same as the recommender system 100a except the recommender system 100b may generate the model input data by combining (e.g., concatenating) the pairwise dot product 134 with the embeddings 136 but not the embeddings 138. Such combining may be done to emphasize the importance of the user's "deep interests" but not conversational relevancy.

Figure 1C:
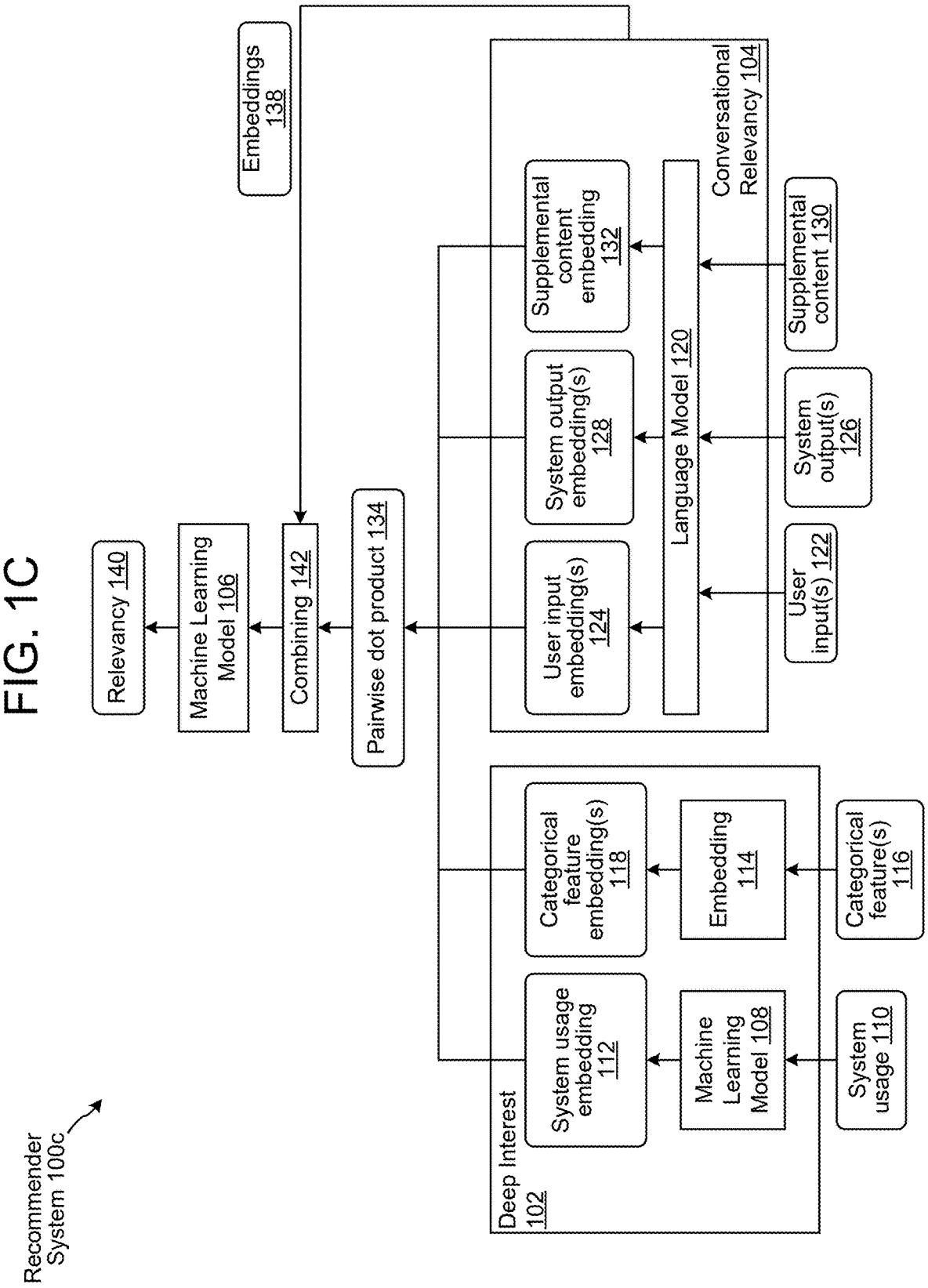
FIG. 1C is a conceptual diagram illustrating another example recommender system, according to embodiments of the present disclosure.

FIG. 1C illustrates a recommender system 100c. The recommender system 100c may be the same as the recommender system 100a except the recommender system 100c may generate the model input data by combining (e.g., concatenating) the pairwise dot product 134 with the embeddings 138 but not the embeddings 136. Such combining may be done to emphasize the importance of conversational relevancy but not the user's "deep interests."

Figure 1D:
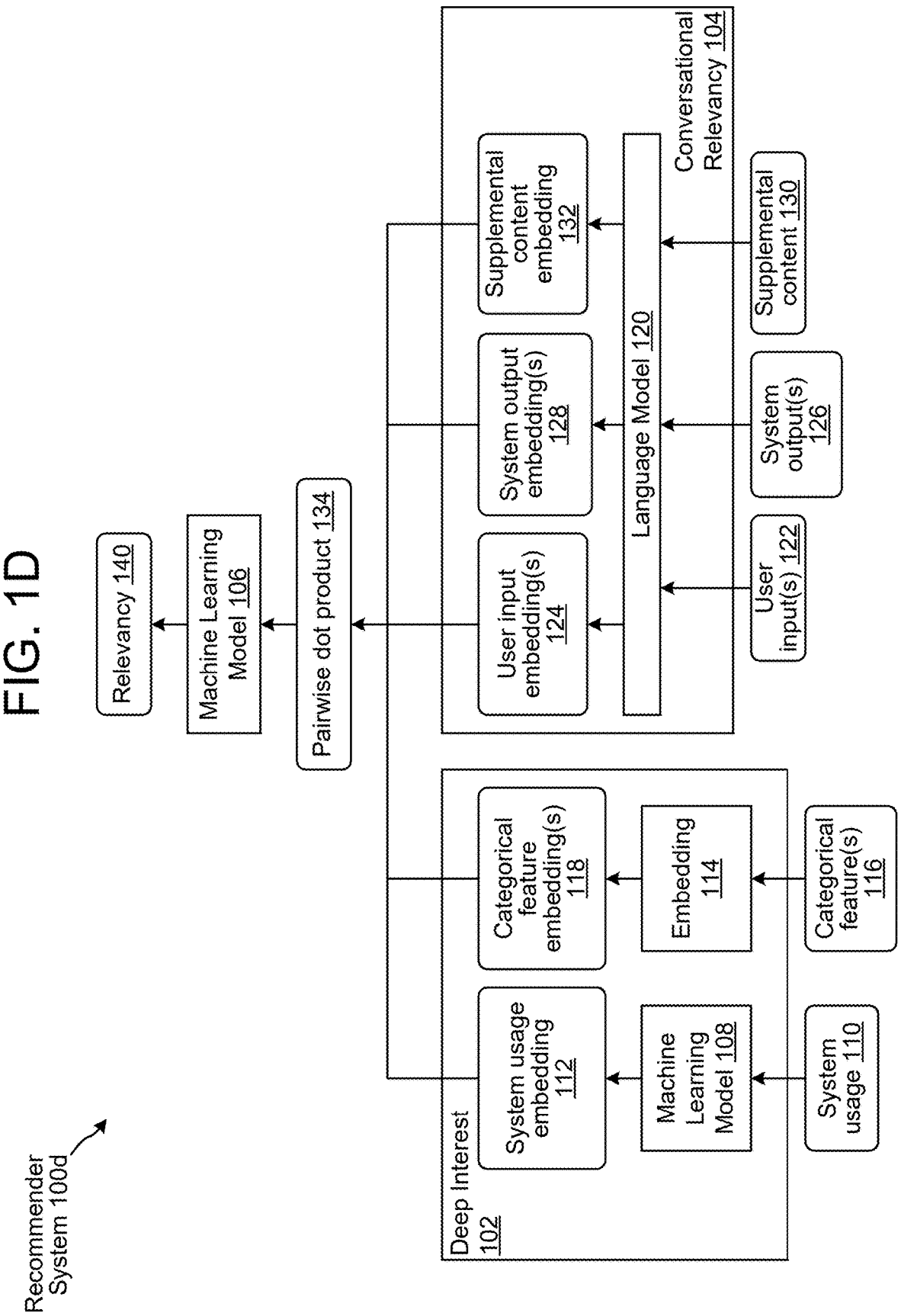
FIG. 1D is a conceptual diagram illustrating another example recommender system, according to embodiments of the present disclosure.

FIG. 1D illustrates a recommender system 100d. The recommender system 100d may be the same as the recommender system 100a except the recommender system 100d may input the pairwise dot product 134 into the machine learning model 106 without combining (e.g., concatenating) the pairwise dot product 134 with the embeddings 136 or the embeddings 138.

The recommender system 100a/100b/100c/100d may be trained in a batched offline manner. The recommender system 100a/100b/100c/100d may be trained using a training dataset (e.g., containing about five hundred thousand examples of user interactions with the system's previously output supplemental content) and evaluated using a test dataset (e.g., containing about 200 thousand examples). Parameters of the recommender system 100a/100b/100c/100d may be tuned based on an independent validation dataset (e.g., containing about 100 thousand examples).

For the training process, cross-entropy loss may be employed to optimize conversion rates (i.e., rates at which user's follow up presented supplemental content with a user input relating to the supplemental content). The recommender system 100a/100b/100c/100d may be trained using the Adagrad optimizer.

In some embodiments, the embeddings 136, generated by the deep interest component 102, may be stored in association with the user identifier and/or supplemental content identifier with respect to which the deep interest component 102 generated the embeddings 136. Such storing may enable the deep interest component 102 to simply recall the embeddings 136 from storage the next time the deep interest component 102 is tasked with processing with respect to the user identifier and/or supplemental content identifier, as opposed to having to recompute the embeddings 136.

In some embodiments, the conversational relevancy component 104 may take as input context data including, for example, a sentiment corresponding to the user input(s) 122, time data representing a present time, device type data corresponding to the device to present the supplemental content 130, and/or location data (e.g., geographic location, location within a building, etc.) corresponding to a location of the device. In such embodiments, the context data may be processed using the embedding component 114 to generate a context embedding that is used to generate the pairwise dot product 134 and included in the embeddings 138.

Figure 2:
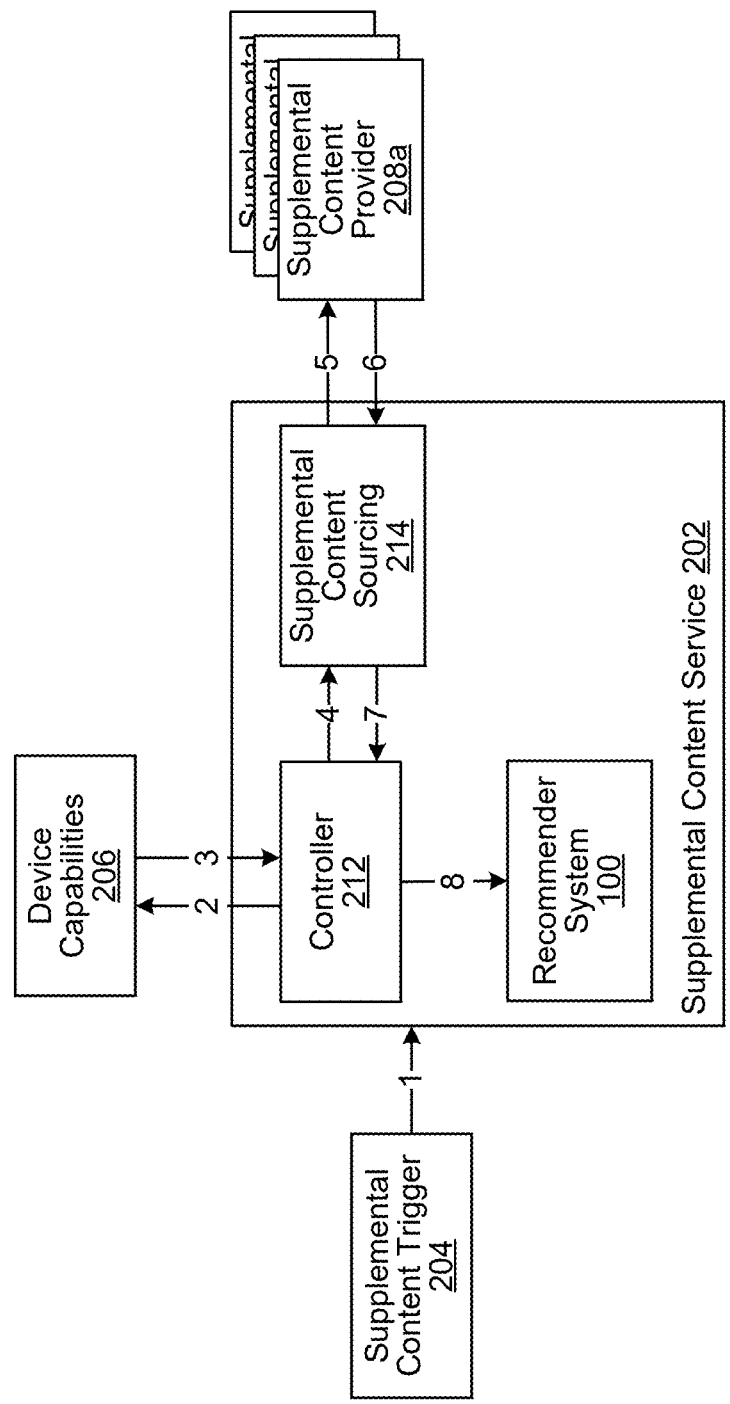
FIG. 2 is a conceptual diagram illustrating components and processing of a supplemental content service, according to embodiments of the present disclosure.

FIG. 2 illustrates components and processing of a supplemental content service 202, according to embodiments of the present disclosure. Although the figures and discussion of the present disclosure illustrate certain steps in a particular order, the steps described may be performed in a different order (as well as certain steps removed or added) without departing from the present disclosure.

The supplemental content service 202 may communication with various components. With reference to FIG. 2, the supplemental content service 202 may communicate with one or more supplemental content trigger components (collectively illustrated as a supplemental content trigger component 204), a device capabilities component 206, one or more supplemental content providers 208 (e.g., a first supplemental content provider 208a, a second supplemental content provider 208b, etc.), and a supplemental content history storage 210. As further illustrated in FIG. 2, the supplemental content service 202 may include a controller component 212, a supplemental content sourcing component 214, and the recommender system 100.

The supplemental content trigger component 204 is configured to determine when an appropriate moment to output supplemental content occurs. For example, the supplemental content trigger component 204 may determine supplemental content should be output upon determining that a dialog session has ended (e.g., upon determining that a dialog session identifier has been associated with a "closed," "ended," "completed", or other like identifier). In embodiments where the supplemental content trigger component 204 is implemented as a skill component, said skill component may determine supplemental content should be output upon the skill component completing its processing as part of a dialog session. For further example, the supplemental content trigger component 204 may determine supplemental content should be output upon determining output of user-requested, long-form content (e.g., song, playlist of songs, video, movie, audiobook, etc.) has ended. As another example, the supplemental content trigger component 12 204 5 may determine supplemental content should be output upon determining the user has dismissed an alarm or timer (e.g., a timer for a recipe as set by the user, a morning wakeup alarm set by the user, etc.) implemented by the supplemental content trigger component 204, or more generally another component of the system. For further example (e.g., when the supplemental content trigger component 204 is implemented by a user device), the supplemental content trigger component 204 may determine supplemental content should be output upon determining a photograph has been taken using the user device. As another example, the supplemental content trigger component 204 may determine supplemental content should be output upon the user device receiving a user input requesting a present time, and after the system causes the user device to output the requested present time. For further example, the supplemental content trigger component 204 may determine supplemental content should be output upon determining a two-way communication session (e.g., a voice call, a video call, etc.) has ended. As another example, the supplemental content trigger component 204 may determine supplemental content should be output upon determining a user device is no longer presenting visual content (other than a home screen) on a display of or associated with the user device. In some embodiments, the supplemental content trigger component 204 may make the foregoing determination after determining the user device is no longer displaying said visual content for at least a threshold amount of time (e.g., 30 seconds). In a further example, the supplemental content trigger component 204 may determine supplemental content should be output upon determining an individual is looking at a user device (e.g., by processing image data using gaze detection processing). For example, the user device may receive image data from one or more cameras. A face detection algorithm (executed, for example, by an object detection component) may identify a face in the image data. The face may then be isolated in the image data, and the resulting image data may be processed using a directness classifier to determine if the user's gaze is directed to the user device or elsewhere. If the user is looking at the user device, then the supplemental content trigger component 204 may determine that user's gaze is directed at the user device and may determine supplemental content should be output. As another example, the supplemental content trigger component 204 may determine supplemental content should be output upon determining presence of an individual near a user device (e.g., by processing motion data, image data, etc.). One skilled in the art will appreciate that the foregoing examples are merely illustrative, and that the present disclosure covers over situations in which the supplemental content trigger component 204 may determine supplement content should be output.

As used herein, a "skill component" may refer to software that may be placed on a machine or a virtual machine (e.g., software that may be launched in a virtual instance when called) and is configured to perform one or more actions and/or generate one or more instances of output data in response thereto. For example, a music skill component may provide a link to audio data of a song, a weather skill component may provide weather information, a recipe skill component may provide text data and/or image data corresponding to a recipe, etc. A skill component may be associated with a domain.

Upon the supplemental content trigger component 204 determining an appropriate moment to output supplemental content has occurred, the supplemental content trigger component 204 may, either directly or indirectly, invoke (step 1) the supplemental content service 202. Such invocation may involve the supplemental content trigger component 204 sending, to the supplemental content service 202, data including, for example, an identifier corresponding to the supplemental content trigger component 204, a user (profile) identifier corresponding to a user profile of the user, a device identifier (e.g., a device type identifier and/or a serial number) corresponding to the user device to be used to present supplemental content, a geolocation (e.g., representing as a country code and/or postal code) of the user device, trigger context data, and a supplemental content opportunity identifier collectively identifying the foregoing data. The trigger context data may include, for example, a user input identifier corresponding to a user input with respect to which the supplemental content trigger component 204 determined supplemental content should be output, NLU output data (e.g., an intent indicator and optionally one or more entity types and corresponding one or more entity values) corresponding to the user input, and/or a language (e.g., English, Spanish, Portuguese, Italian, etc.) in which the user input was provided.

When the data, received from the supplemental content trigger component 204 at step 1, include a device serial number but does not indicate a device type, the controller component 212, of the supplemental content service 202, may query (step 2) the device capabilities component 206 to for the device type associated with the serial number. In some embodiments, the user device, to be used to present the supplemental content, may be a device the user is presently interacting with. In other embodiments, the device, to be used to present the supplemental content, may be a device associated with or represented in user profile data of the user, but which the user is not presently interacting with.

The device capabilities component 206 may include or be in data communication with a device capabilities storage storing associations between device identifiers and device type information. In response to the query received at step 2, the device capabilities component 206 may identify device type data associated with the device identifier included in the query, and may send (step 3) the identified device type data to the supplemental content service 202.

In response to receiving the data at step 1 (and optionally step 3), the controller component 212 may send (step 4), to the supplemental content sourcing component 214, a request for supplemental content. Said request may include some or all of the data received by the controller component 212 at step 1 (and optionally step 3).

In response to receiving the data at step 4, the supplemental content sourcing component 214 may request (step 5) supplemental content from one or more (in some embodiments a plurality of) supplemental content providers 208.

In response to receiving the aforementioned request, a supplemental content provider 208 may send (step 6), to the supplemental content sourcing component 214, a response to the request. The response may be in the form of supplemental content presentation data as described in detail herein above. In some situations, the supplemental content provider 208 may process the request and determine the supplemental content provider 208 does not have any supplemental content to be output. In such situations, the supplemental content provider 208 may not send a response at step 6, or the supplemental content provider 208 may send a response including the supplemental content opportunity identifier, an identifier of the supplemental content provider 208 sending the response, and data representing the supplemental content provider 208 does not have supplemental content for output with respect to the supplemental content opportunity identifier. In situations where the supplemental content provider 208 processes the request and determines supplemental content to be output, the substance of the response may vary.

Figure 3:
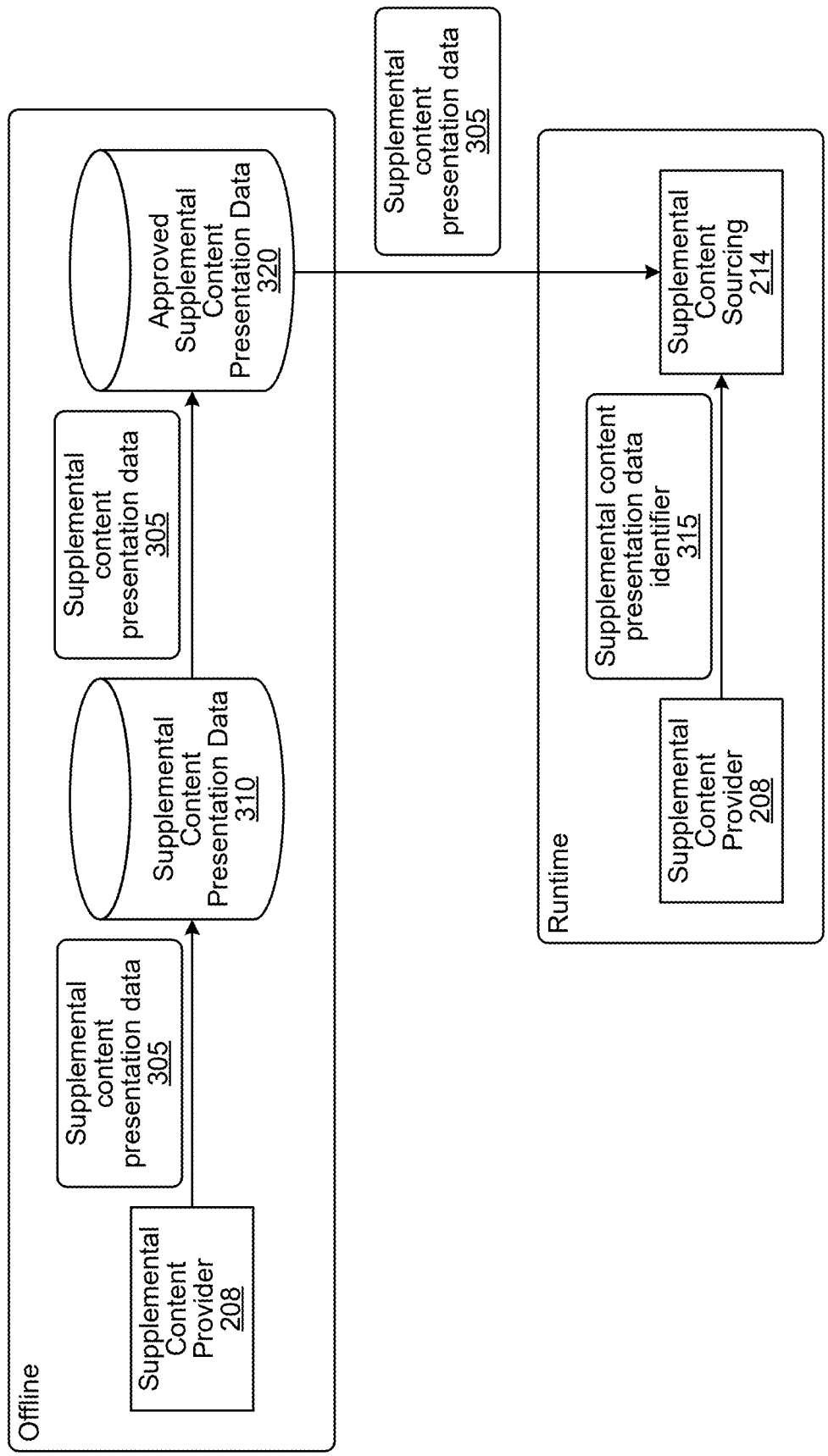
FIG. 3 is a conceptual diagram illustrating how supplemental content presentation data may be stored during offline operations, and retrieved during runtime operations, according to embodiments of the present disclosure.

Referring to FIG. 3, the following describes an embodiment in which a supplemental content provider 208 may generate supplemental content presentation data 305 during offline operations, and the supplemental content sourcing component 214 may retrieve the supplemental content presentation data 305 from storage during runtime operations. This approach may be referred to as a centralized approach as the system may store various instances of supplemental content presentation data generated by various supplemental content providers.

During offline operations, a supplemental content provider 208 may generate supplemental content presentation data 305. The supplemental content presentation data 305 may include various instances of data for presenting supplemental content. The supplemental content presentation data 305 may include supplemental content in the form of text and/or a link to content (e.g., an image(s), graphics, icon(s), text, video, etc.) to be visually presented as the supplemental content. The supplemental content presentation data 305 may include a portion representing how the supplemental content is to be presented (e.g., visually, audibly as synthesized speech, or visually and audibly). For supplemental content to be visually presented, the supplemental content presentation data 305 may include one or more presentation/output specifications (e.g., mode, shape, color, font, minimum width, maximum width, minimum height, maximum height, etc.) for how the supplemental content is to be visually rendered. Moreover, the supplemental content presentation data 305 include data representing the supplemental content is to be visually rendered using a specific software/application version.

The supplemental content provider 208 may cause the supplemental content presentation data 305 to be stored in a supplemental content presentation data storage 310. Within the supplemental content presentation data storage 310, the supplemental content presentation data 305 may be associated with an identifier that uniquely identifies the supplemental content presentation data 305.

After the supplemental content presentation data 305 is stored in the supplemental content presentation data storage 310, the supplemental content presentation data 305 may undergo a review process. The review process may be conducted to ensure the supplemental content presentation data 305 provides a beneficial user experience, includes user age-appropriate supplemental content, etc. In some embodiments, the review process may be performed by one or more components of the system. In other embodiments, the review process may be performed manually. In still other embodiments, the review process may include a combination of computerized/automated and manual review.

If the supplemental content presentation data 305 is not approved during the review process, the supplemental content presentation data 305 may remain stored in the supplemental content presentation data storage 310, and data may be sent to the supplemental content provider 208 indicating the supplemental content presentation data 305 was not approved. In response to such data, a developer, associated with the supplemental content provider 208, may modify the supplemental content presentation data 305, and the modified supplemental content presentation data may undergo the review process.

Alternatively, if the supplemental content presentation data 305 is approved during the review process, the supplemental content presentation data 305 may be stored in an approved supplemental content presentation data storage 320. The system may implement the approved supplemental content presentation data storage 320. Within the approved supplemental content presentation data storage 320, the (approved) supplemental content presentation data 305 may be associated with the identifier that uniquely identifies the supplemental content presentation data 305.

In some embodiments, if the supplemental content provider 208 is trusted, the supplemental content presentation data 305 may be permitted to bypass the review process. That is, the supplemental content presentation data 305 may be stored in the approved supplemental content presentation data storage 320 upon being generated by the supplemental content provider 208, and stored in the supplemental content presentation data storage 310. As used herein, a supplemental content provider may be "trusted" when the supplemental content provider is associated with at least a threshold rating generated based on user feedback received from users of the system.

In some embodiments, supplemental content presentation data may be deleted from the supplemental content presentation data storage 310 upon the supplemental content presentation data being approved during the review process. In other embodiments, an instance of a supplemental content presentation data may remain in the supplemental content presentation data storage 310 after the supplemental content presentation data is approved and stored in the approved supplemental content presentation data storage 320.

At runtime, the supplemental content provider 208 may send (at step 6 in FIG. 2), to the supplemental content sourcing component 214, the supplemental content opportunity identifier, an identifier of the supplemental content provider 208, and the supplemental content presentation data identifier 315 of the supplemental content presentation data 305. In response, the supplemental content sourcing component 214 may query, using the supplemental content presentation data identifier 315 the approved supplemental content presentation data storage 320 to obtain the supplemental content presentation data 305.

The foregoing describes an approach in which the system may store supplemental content presentation data during offline operations, and the supplemental content sourcing component 214 may retrieve supplemental content presentation data from said storage at runtime. Alternatively, a decentralized approach may be implemented in which the supplemental content provider 208 provides the supplemental content presentation data at runtime, in response to receiving a request for supplemental content from the supplemental content sourcing component 214.

Referring again to FIG. 2, in response to receiving the request at step 5, the supplemental content provider 208 may send (step 6), to the supplemental content sourcing component 214, the supplemental content opportunity identifier, an identifier of the supplemental content provider 208, and supplemental content presentation data. The supplemental content provider 208 may generate this supplemental content presentation data prior to or after receiving the request at step 5. The supplemental content presentation data, sent at step 6 in this decentralized approach, may include the same types of data as the supplemental content presentation data 305 described above with respect to the centralized approach of FIG. 3.

In the centralized approach described above with respect to FIG. 3, the supplemental content sourcing component 214 may receive one or more supplemental content presentation data identifiers at step 6 in FIG. 2, and may retrieve one or more corresponding instances of supplemental content presentation data from the approved supplemental content presentation data storage 320. In the decentralized approach described above, the supplemental content sourcing component 214 may receive one or more instances of supplemental content presentation data at step 6 in FIG. 2. In some embodiments, a supplemental content provider may be permitted to send only one instance of supplemental content presentation data in response to receiving the request at step 5. In other embodiments, a supplemental content provider may be permitted to send one or more instances of supplemental content presentation data in response to receiving the request at step 5.

The supplemental content sourcing component 214 may send (step 7), to the controller component 212, the plurality of instances of supplemental content presentation data received or retrieved by the supplemental content sourcing component 214. In response, the controller component 212 may invoke (step 8) the recommender system 100 to process, as described herein above with respect to FIG. 1A through 1D, with respect to each instance of supplemental content presentation data.

Language modeling is the use of various statistical and probabilistic techniques to determine the probability of a given sequence of words occurring in a sentence. Language models analyze bodies of text data to provide a basis for their word predictions. The language models are generative models. In some embodiments, one or more of the language models may be a large language model (LLM). A language model (e.g., LLM) is an advanced artificial intelligence system designed to process, understand, and generate human-like text based on relatively large amounts of data. In some embodiments, a language model (or another type of generative model) may be further designed to process, understand, and/or generate multi-modal data including audio, text, image, and/or video. A language model may be built using deep learning techniques, such as neural networks, and may be trained on extensive datasets that include text (or other type of data, such as multi-modal data including text, audio, image, video, etc.) from a broad range of sources, such as old/permitted books and websites, for natural language processing. An LLM uses an expansive training dataset, as compared to a relatively smaller language model, and can include a relatively large number of parameters (in the range of billions, trillions or more), hence, they are called "large" language models. In some embodiments one or more of the language models (and their corresponding operations, discussed herein below) may be the same language model.

An artificial intelligence (AI) system may use ASR, NLU, NLG, and/or TTS, each with and/or without a language model, for processing user inputs, including natural language inputs (e.g., typed and spoken inputs).

In some embodiments (e.g., where one or more of the language models are LLMs), the one or more language models may be transformer-based seq2seq models involving an encoder-decoder architecture. In an encoder-decoder architecture, the encoder may produce a representation of an input (e.g., audio, text, image, video, etc.) using a bidirectional encoding, and the decoder may use that representation to perform some task. In some such embodiments, one or more of the language models may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the language model may be pre-trained for approximately 1 trillion tokens. Being trained on CLM tasks, the one or more language models may be capable of in-context learning. An example of such a language model is Alexa generative models.

In other embodiments (e.g., where one or more of the language models are an LLM), the one or more language models may be a decoder-only architecture. The decoder-only architecture may use left-to-right (unidirectional) encoding of the input (e.g., audio, text, image, video, etc.). An example of such a language model is the Generative Pre-trained Transformer 3 (GPT-3) and other versions of GPT. GPT-3 has a capacity of (approximately) 175 billion machine learning parameters.

Other examples of language models (e.g., LLMs) include BigScience Large Open-science Open-access Multilingual Language Model (BLOOM), Language Model for Dialogue Applications model (LaMDA), Bard, Large Language Model Meta AI (LLaMA), Amazon Titan Foundational Model, etc.

In some embodiments, the system may include one or more machine learning models instead of or in addition to the language model(s). Such machine learning model(s) may receive text and/or other types of data as inputs (e.g., audio, image, video, etc.), and may output text and/or the other types of data. Such model(s) may be neural network-based models, deep learning models, classifier models, autoregressive models, seq2seq models, etc.

In some embodiments (e.g., where the language model(s) is an LLM), the input to the language model may be in the form of a prompt. A prompt may be a natural language input, for example, a directive or request, for the language model to generate an output according to the prompt. The output generated by the language model may be a natural language output responsive to the prompt. In some embodiments, the output may additionally or instead be another type of data, such as audio, image, video, etc. The prompt and the output may be text in a particular language (e.g., English, Spanish, German, etc.). For example, for an example prompt "how do I cook rice?", the language model may output a recipe (e.g., a step-by-step process represented by text, audio, image, video, etc.) to cook rice. As another example, for an example prompt "I am hungry. What restaurants in the area are open?", the language model may output a list of restaurants near the user 405 that are open at the time of the user prompt.

The language models may be configured using various learning techniques. For example, in some embodiments, the language models may be configured using few-shot learning. In few-shot learning, the model learns how to learn to solve the given problem. In this approach, the model is provided with (e.g., in the prompt) a limited number of examples (i.e., "few shots") from the new task, and the model uses this information to adapt and perform well on that task. Few-shot learning may require fewer amount of training data than implementing other fine-tuning techniques. For further example, in some embodiments, the language models may be configured using one-shot learning, which is similar to few-shot learning, except the model is provided with a single example (e.g., in the prompt). As another example, in some embodiments, the language models may be configured using zero-shot learning. In zero-shot learning, the model solves the given problem without examples of how to solve the specific/similar problem and just based on the model's training dataset. In this approach, the model is provided with data not observed during training, and the model learns to generate an appropriate output based on its learning of other data.

Figure 4:
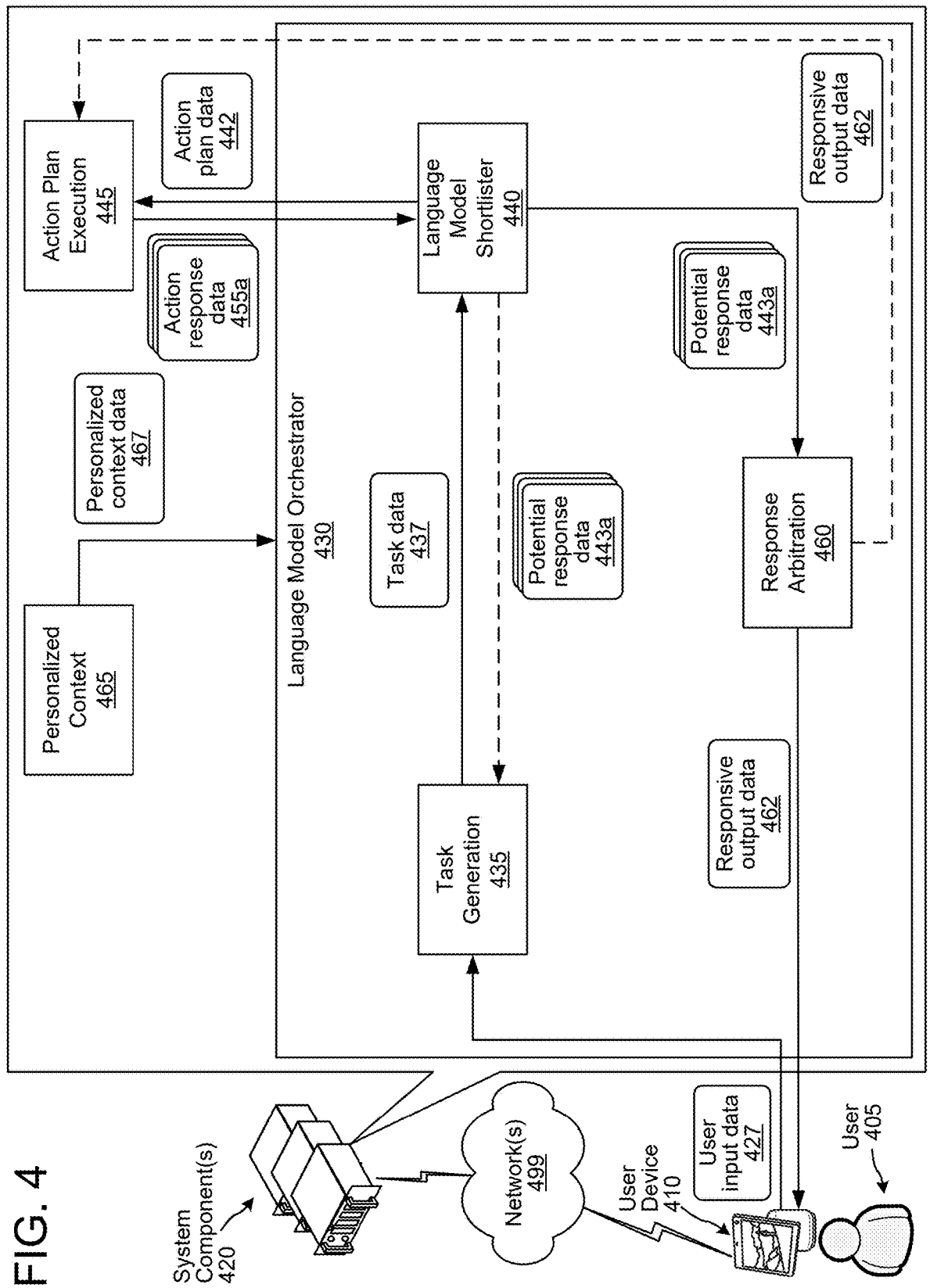
FIG. 4 is a conceptual diagram illustrating example components and processing of a system configured to use a language model(s) to determine a response to a user input, according to embodiments of the present disclosure.

FIG. 4 illustrates further example components included in the system of the present disclosure. As shown in FIG. 4, the system may include a user device 410, local to a user 405, in communication with a system component(s) 420 via a network(s) 499. The network(s) 499 may include the Internet and/or any other wide- or local-area network, and may include wired, wireless, and/or cellular network hardware.

The system component(s) 420 may include various components, such as a language model orchestrator component 430, a personalized context component 465, and an action plan execution component 445. The language model orchestrator component 430 may include a task generation component 435, a language model shortlister component 440, and a response arbitration component 460.

In some embodiments, the language model orchestrator component 430 may generate prompt data representing a prompt for input to the language models. As shown in FIG. 4, the system component(s) 420 receive user input data 427, which may be provided to the language model orchestrator component 430. In some instances, the user input data 427 may correspond to various data types, such as text (e.g., a text or tokenized representation of a user input), audio, image, video, etc. For example, the user input data may include input text (or tokenized) data when the user input is a typed natural language user input. For further example, prior to the language model orchestrator component 430 receiving the user input data 427, another component (e.g., an automatic speech recognition (ASR) component 550) of the system may receive audio data representing the user input. The ASR component 550 may perform ASR processing on the audio data to determine ASR data corresponding to the user input, which may correspond to a transcript of the user input. As described below, with respect to FIG. 5, the ASR component 550 may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate the ASR component's 550 level of confidence that the corresponding hypothesis represents what the user said. The ASR component 550 may also determine token scores corresponding to each token/word of the ASR hypothesis, where the token score indicates the ASR component's 550 level of confidence that the respective token/word was spoken by the user. The token scores may be identified as an entity score when the corresponding token relates to an entity. In some instances, the user input data 427 may include a top scoring ASR hypothesis of the ASR data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system may include one or more components configured to process such user inputs to generate the text or tokenized representation of the user input (e.g., the user input data 427).

In some embodiments, the language model orchestrator component 430 may receive input data, which may be processed in a similar manner as the user input data 427 as described herein. The input data may be received in response to detection of an event such as change in device state (e.g., front door opening, garage door opening, TV turned off, etc.), occurrence of an acoustic event (e.g., baby crying, appliance beeping, etc.), presence of a user (e.g., a user approaching the user device 410, a user entering the home, etc.). In some embodiments, the system may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system may include one or more components configured to process the input data to generate a natural language representation of the input data. The system may process the input data and may perform an action. For example, in response to detecting a garage door opening, the system may cause garage lights to turn on, living room lights to turn on, etc. As another example, in response to detecting an oven beeping, the system may cause a user device 410 (e.g., a smartphone, a smart speaker, etc.) to present an alert to the user. The language model orchestrator component 430 may process the input data to generate tasks that may cause the foregoing example actions to be performed.

The user input data 427 may be received at the task generation component 435 of the language model orchestrator component 430, which may be configured to generate a list (e.g., one or more) of tasks (e.g., steps/actions) that are to be completed in order to perform an action responsive to the user input and select a task of the list of the tasks that is to be completed first (e.g., in a current iteration of processing by the system), as described in detail herein. For example, for a user input of "What is the weather for today," the task generation component 435 may generate a list of tasks of "(1) determine current outside temperature from thermostat; and (2) determine weather forecast for today" and select the task of "determine weather forecast for today" to be completed first. In instances where the task generation component 435 generates more than one task to be completed in order to perform the action responsive to the user input, the task generation component 435 may further maintain and prioritize the list of tasks as the processing of the system with respect to the user input is performed. In other words, as the system processes to complete the list of tasks, the task generation component 435 may (1) incorporate the potential responses associated with completed tasks into data provided to other components of the system; (2) update the list of tasks to indicate completed (or attempted, in-progress, etc.) tasks; (3) generate an updated prioritization of the tasks remaining to be completed (or tasks to be attempted again); and/or (4) determine an updated current task to be completed.

In some embodiments, the task generation component 435 may process as described above using one or more language models (e.g., LLMs). For example, the task generation component 435 may include a language model (e.g., and LLM) configured to generate the list of tasks that are to be completed in order to perform the action responsive to the user input and select a task of the list of tasks that is to be completed first. In some such embodiments, the user input data 427 may be received at a prompt generation component configured to generate a prompt for input to the language model. The prompt may include the user input data 427 and various other information usable by the language model to generate the list of tasks that are to be completed in order to perform the action responsive to the user input (e.g., an indication of one or more remaining tasks to be completed with respect to the user input, an indication of one or more potential responses associated with a completed task(s), and/or various contextual signals associated with the user input.) The prompt may be a directive for the language model to determine the list of tasks given the information included in the prompt. The language model may process the prompt to generate the list of tasks.

The task generation component 435 may generate and send task data 437 representing the selected task to be completed and various other information needed to perform further processing with respect to the task (e.g., the user input data 427, an indication of the selected task, potential responses associated with previous tasks, the remaining task(s), and context data associated with the user input data 427, as described in detail herein) to the language model shortlister component 440.

The language model shortlister component 440 may be configured to determine one or more components (e.g., a responding component, such as APIs, skill component(s), language model (e.g., LLM) agent component(s), a TTS component, etc. as discussed herein) configured to perform an action related to the user input or the current task. The language model shortlister component 440 may further be configured to generate and cause the execution of a request (s) (e.g., an API call(s), an incomplete API call/API call format, an indication of an action to be performed by a component, etc.) for the one or more components to provide a potential responses(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task). For example, for a current task of "determine weather forecast for today," the language model shortlister component 440 may generate requests of "use Weather Application A to determine weather forecast for today" and "use Weather Application B to determine weather forecast for today," or the like.

In some embodiments, the language model shortlister component 440 may process as described above using one or more language models (e.g., LLMs). For example, the language model shortlister component 440 may include a language model (e.g., an LLM) configured to determine one or more components configured to perform an action related to the user input or the current task and cause the execution of a request(s) for the one or more components to provide a potential response(s) to the user input or current task. In some such embodiments, the task data 437 may be received at a prompt generation component configured to generate a prompt for input to the language model. The prompt may include the task data 437 and an indication of one or more components (e.g., APIs) determined to be relevant to the current task/the user input. The prompt may be a directive for the language model to generate a request for a component(s) (of the components determined to be relevant) to provide a potential response(s) to the user input or current task given the information included in the prompt. The language model may process the prompt to generate the request(s).

Such requests may be represented in the action plan data 442 sent to the action plan execution component 445. The action plan execution component 445 may identify the request(s) in the action plan data 442, generate executable API calls corresponding to the request(s), and cause the corresponding components (e.g., the responding component(s)) to generate action response data 458a-n representing the requested potential response(s), where individual action response data 458a may be provided by/correspond to a particular responding component. In some embodiments, the action response data 458a-n may include an identifier (e.g., a component name, an alphanumerical value associated with the component, etc.) for the component providing the data. The language model shortlister component 440 receives and processes the action response data 458a-n and generates potential response data 443a-n representing the potential response(s) (e.g., relevant potential responses, selected potential responses, ranked potential responses, etc.) for further processing (e.g., as described in detail herein). If the language model shortlister component 440 determines that there are no remaining tasks to generate potential responses for, the language model shortlister component 440 may send the potential response data 443a-n to the response arbitration component 460.

The potential response data 443a-n, in some embodiments, may be determined based on receiving potential responses from various different components that may be relevant in responding to the user input data 427. For example, the potential response data 443a-n may include a first potential response from a first component configured to perform a first task determined by the task generation component 435, a second potential response from a second component configured to perform a second task determined by the task generation component 435, etc. The potential response data 443a-n can include more than one potential response relating to an individual task. In some embodiments, the potential response data 443a-n may be natural language data.

The response arbitration component 460 processes the potential response data 443a-n to determine whether the potential responses generated for the one or more tasks are responsive to the user input. The response arbitration component 460 processes the potential response data 443a-n (representing at least the generated potential responses) and selects one or more of the potential responses that are determined to be responsive to the user input and/or determines that none of the actions are responsive to the user input. For example, the response arbitration component 460 may process the potential response data 443a-n to determine if one or more of the potential responses performable by the API(s) (e.g., the potential responses and/or potential actions) are responsive to the current task. In some embodiments, the response arbitration component 460 may generate a natural language summary of one or more of the selected responses and output the natural language summary. For example, for a user input of "what is the weather for today" and potential responses of "The weather for today is a high of 75 and a low of 68" and "The weather for today is mostly sunny with a slight chance of rain in the evening," the response arbitration component 460 may generate a natural language summary of "The weather for today is expected to be mostly sunny with a high of 75 and a low of 68 and a slight chance of rain in the evening," or the like.

In some embodiments, the response arbitration component 460 may process as described above using one or more language models (e.g., LLMs). For example, the response arbitration component 460 may include a language model (e.g., an LLM) configured to generate a response to the user input using one or more of the potential responses that are determined to be responsive to the user input and/or determine that none of the potential responses are responsive to the user input. In some such embodiments, the user input data 427 and the potential responses (and in some embodiments, the contextual signals associated with the user input) may be received at a prompt generation component configured to generate a prompt for input to the language model including the information. The prompt may be a directive for the language model to, given the information included in the prompt, generate a response to the user input using one or more of the potential responses that are determined to be responsive to the user input and/or indicate that none of the potential responses are responsive to the user input. The language model may process the prompt to generate the response to the user input or the indication that none of the potential responses are responsive to the user input. In instances where the language model generates the indication that none of the potential responses are responsive to the user input, the indication may further include a request for information to be output to the user (and/or provided to another component of the system configured to determine the information).

The output generated by the response arbitration component 460 may be provided to one or more components of the system (e.g., the TTS component 556, a visual output component, etc. via, for example, the action plan execution component 445) and/or sent to the device 410 for output to the user.

Figure 5:
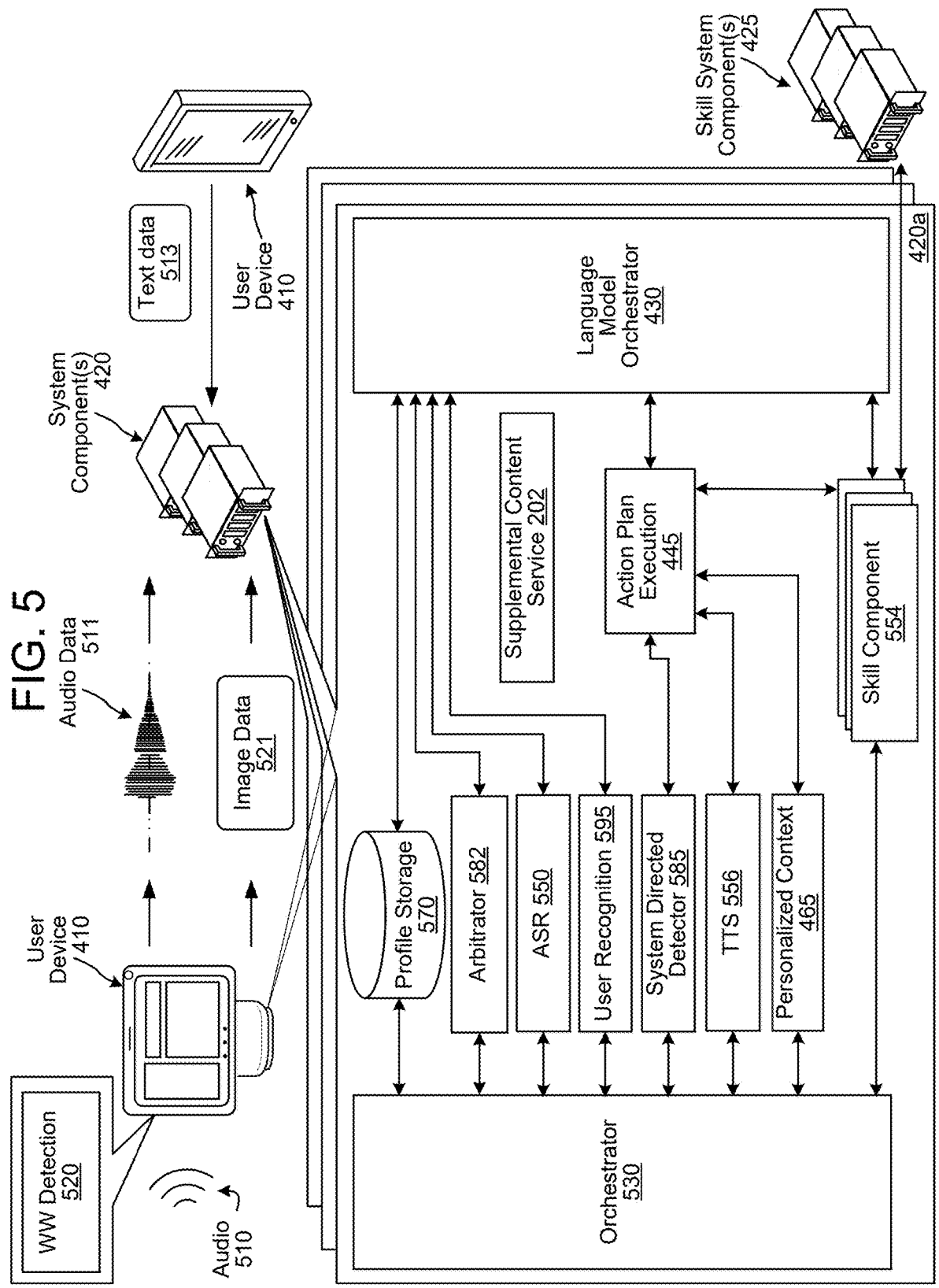
FIG. 5 is a conceptual diagram illustrating components of the system, according to embodiments of the present disclosure.

The system may operate using various components as described in FIG. 5. The various components may be located on same or different physical devices. Communication between various components may occur directly or across a network(s) 499. The user device 410 may include audio capture component(s), such as a microphone or array of microphones of a user device 410, captures audio 510 and creates corresponding audio data. Once speech is detected in audio data representing the audio 510, the user device 410 may determine if the speech is directed at the user device 410/system component(s). In at least some embodiments, such determination may be made using a wakeword detection component 520. The wakeword detection component 520 may be configured to detect various wakewords. In at least some examples, each wakeword may correspond to a name of a different digital assistant. An example wakeword/digital assistant name is "Alexa." In another example, input to the system may be in form of text data 513, for example as a result of a user typing an input into a user interface of user device 410. Other input forms may include indication that the user has pressed a physical or virtual button on user device 410, the user has made a gesture, etc. The user device 410 may also capture images using camera(s) of the user device 410 and may send image data 521 representing those image(s) to the system component(s). The image data 521 may include raw image data or image data processed by the user device 410 before sending to the system component(s). The image data 521 may be used in various manners by different components of the system to perform operations such as determining whether a user is directing an utterance to the system, interpreting a user command, responding to a user command, etc.

The wakeword detection component 520 of the user device 410 may process the audio data, representing the audio 510, to determine whether speech is represented therein. The user device 410 may use various techniques to determine whether the audio data includes speech. In some examples, the user device 410 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 410 may implement a classifier configured to distinguish speech from background noise. The classifier may be implemented by techniques such as linear classifiers, support vector machines, and decision trees. In still other examples, the user device 410 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 510, is analyzed to determine if specific characteristics of the audio data match preconfigured acoustic waveforms, audio signatures, or other data corresponding to a wakeword.

Thus, the wakeword detection component 520 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 520 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 520 and/or input is detected by an input detector, the user device 410 may "wake" and begin transmitting audio data 511, representing the audio 510, to the system component(s) 420. The audio data 511 may include data corresponding to the wakeword; in other embodiments, the portion of the audio corresponding to the wakeword is removed by the user device 410 prior to sending the audio data 511 to the system component(s) 420. In the case of touch input detection or gesture based input detection, the audio data may not include a wakeword.

In some implementations, the system may include more than one system component(s). The system component(s) 420 may respond to different wakewords and/or perform different categories of tasks. Each system component(s) may be associated with its own wakeword such that speaking a certain wakeword results in audio data being sent to and processed by a particular system. For example, detection of the wakeword "Alexa" by the wakeword detection component 520 may result in sending audio data to system component(s) a for processing while detection of the wakeword "Computer" by the wakeword detector may result in sending audio data to system component(s) b for processing. The system may have a separate wakeword and system for different skills/systems (e.g., "Dungeon Master" for a game play skill/system component(s) c) and/or such skills/systems may be coordinated by one or more skill component(s) 554 of one or more system component(s) 420.

The user device 410/system component(s) may also include a system directed input detector 585. The system directed input detector 585 may be configured to determine whether an input to the system (for example speech, a gesture, etc.) is directed to the system or not directed to the system (for example directed to another user, etc.). The system directed input detector 585 may work in conjunction with the wakeword detection component 520. If the system directed input detector 585 determines an input is directed to the system, the user device 410 may "wake" and begin sending captured data for further processing. If data is being processed the user device 410 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 585 determines an input is not directed to the system (such as a speech or gesture directed to another user) the user device 410 may discard the data and take no further action for processing purposes. In this way the system may prevent processing of data not directed to the system, thus protecting user privacy. As an indicator to the user, however, the system may output an audio, visual, or other indicator when the system directed input detector 585 is determining whether an input is potentially device directed. For example, the system may output an orange indicator while considering an input, and may output a green indicator if a system directed input is detected. Other such configurations are possible.

Upon receipt by the system component(s) 420, the audio data 511 may be sent to an orchestrator component 530 and/or the language model orchestrator component 430. The orchestrator component 530 may include memory and logic that enables the orchestrator component 530 to transmit various pieces and forms of data to various components of the system, as well as perform other operations as described herein. In some embodiments, the orchestrator component 530 may optionally be included in the system component(s) 420. In embodiments where the orchestrator component 530 is not included in the system component(s) 420, the audio data 511 may be sent directly to the language model orchestrator component 430. Further, in such embodiments, each of the components of the system component(s) 420 may be configured to interact with the language model orchestrator component 430, the action plan execution component 445, and/or the API provider component.

In some embodiments, the system component(s) 420 may include an arbitrator component 582, which may be configured to determine whether the orchestrator component 530 and/or the language model orchestrator component 430 are to process with respect to the audio data 511. In some embodiments, the language model orchestrator component 430 may be selected to process with respect to the audio data 511 only if the user 405 associated with the audio data 511 (or the user device 410 that captured the audio 510) has previously indicated that the language model orchestrator component 430 may be selected to process with respect to user inputs received from the user 405.

In some embodiments, the arbitrator component 582 may determine the orchestrator component 530 and/or the language model orchestrator component 430 are to process with respect to the audio data 511 based on metadata associated with the audio data 511. For example, the arbitrator component 582 may be a classifier configured to process a natural language representation of the audio data 511 (e.g., output by the ASR component 550) and classify the corresponding user input as to be processed by the orchestrator component 530 and/or the language model orchestrator component 430. For further example, the arbitrator component 582 may determine whether the device from which the audio data 511 is received is associated with an indicator representing the audio data 511 is to be processed by the orchestrator component 530 and/or the language model orchestrator component 430. As an even further example, the arbitrator component 582 may determine whether the user (e.g., determined using data output from the user recognition component 595) from which the audio data 511 is received is associated with a user profile including an indicator representing the audio data 511 is to be processed by the orchestrator component 530 and/or the language model orchestrator component 430. As another example, the arbitrator component 582 may determine whether the audio data 511 (or the output of the ASR component 550) corresponds to a request representing that the audio data 511 is to be processed by the orchestrator component 530 and/or the language model orchestrator component 430 (e.g., a request including "let's chat" may represent that the audio data 511 is to be processed by the language model orchestrator component 430).

In some embodiments, if the arbitrator component 582 is unsure (e.g., a confidence score corresponding to whether the orchestrator component 530 and/or the language model orchestrator component 430 is to process is below a threshold), then the arbitrator component 582 may send the audio data 511 to both of the orchestrator component 530 and the language model orchestrator component 430. In such embodiments, the orchestrator component 530 and/or the language model orchestrator component 430 may include further logic for determining further confidence scores during processing representing whether the orchestrator component 530 and/or the language model orchestrator component 430 should continue processing, as is discussed further herein below.

The arbitrator component 582 may send the audio data 511 to an ASR component 550. In some embodiments, the component selected to process the audio data 511 (e.g., the orchestrator component 530 and/or the language model orchestrator component 430) may send the audio data 511 to the ASR component 550. The ASR component 550 may transcribe the audio data 511 into text data. The text data output by the ASR component 550 represents one or more than one (e.g., in the form of an N-best list) ASR hypotheses representing speech represented in the audio data 511. The ASR component 550 interprets the speech in the audio data 511 based on a similarity between the audio data 511 and pre-established language models. For example, the ASR component 550 may compare the audio data 511 with models for sounds (e.g., acoustic units such as phonemes, senons, phones, etc.) and sequences of sounds to identify words that match the sequence of sounds of the speech represented in the audio data 511. The ASR component 550 sends the text data generated thereby to the arbitrator component 582, the orchestrator component 530, and/or the language model orchestrator component 430. In instances where the text data is sent to the arbitrator component 582, the arbitrator component 582 may send the text data to the component selected to process the audio data 511 (e.g., the orchestrator component 530 and/or the language model orchestrator component 430). The text data sent from the ASR component 550 to the arbitrator component 582, the orchestrator component 530, and/or the language model orchestrator component 430 may include a single top-scoring ASR hypothesis or may include an N-best list including multiple top-scoring ASR hypotheses. An N-best list may additionally include a respective score associated with each ASR hypothesis represented therein.

In some embodiments, the orchestrator component 530 may cause a NLU component (not shown) to perform processing with respect to the ASR data generated by the ASR component 550. The NLU component may attempt to make a semantic interpretation of the phrase(s) or statement(s) represented in the ASR data input therein by determining one or more meanings associated with the phrase(s) or statement(s) represented in the text data. The NLU component may determine an intent representing an action that a user desires be performed and may determine information that allows a device (e.g., the device 410, the system component(s) 420, a skill component 554, a skill system component(s) 425, etc.) to execute the intent. For example, if the ASR data corresponds to "play the 5th Symphony by Beethoven," the NLU component may determine an intent that the system output music and may identify "Beethoven" as an artist/composer and "5th Symphony" as the piece of music to be played. For further example, if the ASR data corresponds to "what is the weather," the NLU component may determine an intent that the system output weather information associated with a geographic location of the device 410. In another example, if the ASR data corresponds to "turn off the lights," the NLU component may determine an intent that the system turn off lights associated with the device 410 or the user 405. However, if the NLU component is unable to resolve the entity—for example, because the entity is referred to by anaphora such as "this song" or "my next appointment"—the system can send a decode request to another speech processing system for information regarding the entity mention and/or other context related to the utterance. The natural language processing system may augment, correct, or base results data upon the ASR data as well as any data received from the system.

The NLU component may return NLU results data (which may include tagged text data, indicators of intent, etc.) back to the orchestrator component 530. The orchestrator component 530 may forward the NLU results data to a skill component(s) 554. If the NLU results data includes a single NLU hypothesis, the NLU component and the orchestrator component 530 may direct the NLU results data to the skill component(s) 554 associated with the NLU hypothesis. If the NLU results data includes an N-best list of NLU hypotheses, the NLU component and the orchestrator component 530 may direct the top scoring NLU hypothesis to a skill component(s) 554 associated with the top scoring NLU hypothesis. The system may also include a post-NLU ranker which may incorporate other information to rank potential interpretations determined by the NLU component.

In some embodiments, after determining that the orchestrator component 530 and/or the language model orchestrator component 430 should process with respect to the user input data 427, the arbitrator component 582 may be configured to periodically determine whether the orchestrator component 530 and/or the language model orchestrator component 430 should continue processing with respect to the user input data 427. For example, after a particular point in the processing of the orchestrator component 530 (e.g., after performing NLU, prior to determining a skill component 554 to process with respect to the user input data 427, prior to performing an action responsive to the user input, etc.) and/or the language model orchestrator component 430 (e.g., after selecting a task to be completed, after receiving the action response data from the one or more components, after completing a task, prior to performing an action responsive to the user input, etc.) the orchestrator component 530 and/or the language model orchestrator component 430 may query the arbitrator component 582 has determined that the orchestrator component 530 and/or the language model orchestrator component 430 should halt processing with respect to the user input data 427. As discussed above, the system may be configured to stream portions of data associated with processing with respect to a user input to the one or more components such that the one or more components may begin performing their configured processing with respect to that data as soon as it is available to the one or more components. As such, the arbitrator component 582 may cause the orchestrator component 530 and/or the language model orchestrator component 430 to begin processing with respect to a user input as soon as a portion of data associated with the user input data 427 is available (e.g., the ASR data, context data, output of the user recognition component 595. Thereafter, once the arbitrator component 582 has enough data to perform the processing described herein above to determine whether the orchestrator component 530 and/or the language model orchestrator component 430 is to process with respect to the user input, the arbitrator component 582 may inform the corresponding component (e.g., the orchestrator component 530 and/or the language model orchestrator component 430) to continue/halt processing with respect to the user input at one of the logical checkpoints in the processing of the orchestrator component 530 and/or the language model orchestrator component 430.

As discussed herein above, in some embodiments, the language model shortlister component 440 (e.g., via the API retriever component XXP20 and/or the shortlister language model XXP40) may be configured to select the orchestrator component 530 to process with respect to the user input and/or a current task to return action response data (e.g., the action response data 458a) representing a response to the user input/current task or a description of an action the orchestrator component 530 may cause to be performed in response to the user input/current task. As such, in some embodiments, although the language model orchestrator component 430 is determined to process with respect to a user input, the language model orchestrator component 430 may determine, during such processing, that the orchestrator component 530 should process with respect to the user input.

A skill system component(s) 425 may communicate with a skill component(s) 554 within the system component(s) 420 directly with the orchestrator component 530 and/or the action plan execution component 445, or with other components. A skill system component(s) 425 may be configured to perform one or more actions. An ability to perform such action(s) may sometimes be referred to as a "skill." That is, a skill may enable a skill system component(s) 425 to execute specific functionality in order to provide data or perform some other action requested by a user. For example, a weather service skill may enable a skill system component(s) 425 to provide weather information to the system component(s) 420, a car service skill may enable a skill system component(s) 425 to book a trip with respect to a taxi or ride sharing service, an order pizza skill may enable a skill system component(s) 425 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 420 may be configured with a skill component 554 dedicated to interacting with the skill system component(s) 425. Unless expressly stated otherwise, reference to a skill, skill device, or skill component may include a skill component 554 operated by the system component(s) 420 and/or skill operated by the skill system component(s) 425. Moreover, the functionality described herein as a skill or skill may be referred to using many different terms, such as an action, bot, app, or the like. The skill component 554 and or skill system component(s) 425 may return output data to the orchestrator component 530.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 556. The TTS component 556 may generate audio data (e.g., synthesized speech) from text data using one or more different methods. Text data input to the TTS component 556 may come from a skill component 554, the orchestrator component 530, or another component of the system. In one method of synthesis called unit selection, the TTS component 556 matches text data against a database of recorded speech. The TTS component 556 selects matching units of recorded speech and concatenates the units together to form audio data. In another method of synthesis called parametric synthesis, the TTS component 556 varies parameters such as frequency, volume, and noise to create audio data including an artificial speech waveform. Parametric synthesis uses a computerized voice generator, sometimes called a vocoder.

The user device 410 may include still image and/or video capture components such as a camera or cameras to capture one or more images. The user device 410 may include circuitry for digitizing the images and/or video for transmission to the system component(s) 420 as image data. The user device 410 may further include circuitry for voice command-based control of the camera, allowing a user 405 to request capture of image or video data. The user device 410 may process the commands locally or send audio data 511 representing the commands to the system component(s) 420 for processing, after which the system component(s) 420 may return output data that can cause the user device 410 to engage its camera.

The system component(s) 420/the user device 410 may include a user recognition component 595 that recognizes one or more users using a variety of data. However, the disclosure is not limited thereto, and the user device 410 may include the user recognition component 595 instead of and/or in addition to the system component(s) 420 without departing from the disclosure.

The user recognition component 595 may take as input the audio data 511 and/or text data output by the ASR component 550. The user recognition component 595 may perform user recognition by comparing audio characteristics in the audio data 511 to stored audio characteristics of users. The user recognition component 595 may also perform user recognition by comparing biometric data (e.g., fingerprint data, iris data, etc.), received by the system in correlation with the present user input, to stored biometric data of users assuming user permission and previous authorization. The user recognition component 595 may further perform user recognition by comparing image data (e.g., including a representation of at least a feature of a user), received by the system in correlation with the present user input, with stored image data including representations of features of different users. The user recognition component 595 may perform additional user recognition processes, including those known in the art.

The user recognition component 595 determines scores indicating whether user input originated from a particular user. For example, a first score may indicate a likelihood that the user input originated from a first user, a second score may indicate a likelihood that the user input originated from a second user, etc. The user recognition component 595 also determines an overall confidence regarding the accuracy of user recognition operations.

Output of the user recognition component 595 may include a single user identifier corresponding to the most likely user that originated the user input. Alternatively, output of the user recognition component 595 may include an N-best list of user identifiers with respective scores indicating likelihoods of respective users originating the user input. The output of the user recognition component 595 may be used to inform processing of the arbitrator component 582, the orchestrator component 530, and/or the language model orchestrator component 430 as well as processing performed by other components of the system.

The system component(s) 420/user device 410 may include a presence detection component that determines the presence and/or location of one or more users using a variety of data.

The system (either on user device 410, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 570 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 410, the user profile (associated with the presented login information) may be updated to include information about the user device 410, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 570 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 570 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 5 may be illustrated as part of system component(s) 420, user device 410, or otherwise, the components may be arranged in other device(s) (such as in user device 410 if illustrated in system component(s) 420 or vice-versa, or in other device(s) altogether) without departing from the disclosure.

In at least some embodiments, the system component(s) may receive the audio data 511 from the user device 410, to recognize speech corresponding to a spoken input in the received audio data 511, and to perform functions in response to the recognized speech. In at least some embodiments, these functions involve sending directives (e.g., commands), from the system component(s) to the user device 410 (and/or other user devices 410) to cause the user device 410 to perform an action, such as output an audible response to the spoken input via a loudspeaker(s), and/or control secondary devices in the environment by sending a control command to the secondary devices.

Thus, when the user device 410 is able to communicate with the system component(s) over the network(s) 499, some or all of the functions capable of being performed by the system component(s) may be performed by sending one or more directives over the network(s) 499 to the user device 410, which, in turn, may process the directive(s) and perform one or more corresponding actions. For example, the system component(s), using a remote directive that is included in response data (e.g., a remote response), may direct the user device 410 to output an audible response (e.g., using TTS processing performed by an on-device TTS component) to a user's question via a loudspeaker(s) of (or otherwise associated with) the user device 410, to output content (e.g., music) via the loudspeaker(s) of (or otherwise associated with) the user device 410, to display content on a display of (or otherwise associated with) the user device 410, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 405 as part of a shopping function, establishing a communication session (e.g., a video call) between the user 405 and another user, and so on.

In at least some embodiments, a hybrid selector, of the user device 410, may send the audio data 511 to the wakeword detection component 520. If the wakeword detection component 520 detects a wakeword in the audio data 511, the wakeword detection component 520 may send an indication of such detection to the hybrid selector. In response to receiving the indication, the hybrid selector may send the audio data 511 to the system component(s) and/or the ASR component of the user device 410. The wakeword detection component 520 may also send an indication, to the hybrid selector, representing a wakeword was not detected. In response to receiving such an indication, the hybrid selector may refrain from sending the audio data 511 to the system component(s), and may prevent the ASR component of the user device 410 from further processing the audio data 511. In this situation, the audio data 511 can be discarded.

The user device 410 may conduct its own speech processing using on-device language processing components, such as an ASR component, similar to the manner discussed herein with respect to the ASR component 550 of the system component(s). The user device 410 may also internally include, or otherwise have access to, other components such as one or more skill components capable of executing commands based on the output of an orchestrator component, a language model orchestrator component, or other results determined by the user device 410/system component(s) (which may operate similarly to skill components 554), an arbitrator component (configured to process in a similar manner to that discussed herein above with respect to the arbitrator component 582), an action plan execution component (configured to process in a similar manner to that discussed herein with respect to the action plan execution component 445), a personalized context component (configured to process in a similar manner to that discussed herein with respect to the personalized context component 465), a user recognition component (configured to process in a similar manner to that discussed herein with respect to the user recognition component 595 of the system component(s)), profile storage (configured to store similar profile data to that discussed herein with respect to the profile storage 570 of the system component(s)), or other components. In at least some embodiments, the profile storage may only store profile data for a user or group of users specifically associated with the user device 410. Similar to as described above with respect to skill component 554, a skill component of the user device 410 may communicate with a skill system component(s) 425. The user device 410 may also have its own TTS component, which may operate similarly to TTS component 556.

In at least some embodiments, the on-device language processing components may not have the same capabilities as the language processing components of the system component(s). For example, the on-device language processing components may be configured to handle only a subset of the natural language user inputs that may be handled by the system component(s). For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s). If the user device 410 attempts to process a natural language user input for which the on-device language processing components are not necessarily best suited, the language processing results determined by the user device 410 may indicate a low confidence or other metric indicating that the processing by the user device 410 may not be as accurate as the processing done by the system component(s).

The hybrid selector, of the user device 410, may include a hybrid proxy (HP) configured to proxy traffic to/from the system component(s). For example, the HP may be configured to send messages to/from a hybrid execution controller (HEC) of the hybrid selector. For example, command/directive data received from the system component(s) can be sent to the HEC using the HP. The HP may also be configured to allow the audio data 511 to pass to the system component(s) while also receiving (e.g., intercepting) this audio data 511 and sending the audio data 511 to the HEC.

In at least some embodiments, the hybrid selector may further include a local request orchestrator (LRO) configured to notify the ASR component of the user device 410 about the availability of new audio data 511 that represents user speech, and to otherwise initiate the operations of local language processing when new audio data 511 becomes available. In general, the hybrid selector may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 410 receives directive data from the system component(s) and chooses to use that remotely-determined directive data.

Thus, when the audio data 511 is received, the HP may allow the audio data 511 to pass through to the system component(s) and the HP may also input the audio data 511 to the on-device ASR component by routing the audio data 511 through the HEC of the hybrid selector, whereby the LRO notifies the on-device ASR component of the audio data 511. At this point, the hybrid selector may wait for response data from either or both of the system component(s) or the local language processing components. However, the disclosure is not limited thereto, and in some examples the hybrid selector may send the audio data 511 only to the local ASR component without departing from the disclosure. For example, the user device 410 may process the audio data 511 locally without sending the audio data 511 to the system component(s).

The local ASR component is configured to receive the audio data 511 from the hybrid selector XXE24, and to recognize speech in the audio data 511. The user device 410 and/or the system component(s) may associate a unique identifier with each natural language user input. The user device 410 may include the unique identifier when sending the audio data 511 to the system component(s), and the response data from the system component(s) may include the unique identifier to identify which natural language user input the response data corresponds.

In at least some embodiments, the user device 410 may include, or be configured to use, one or more skill components that may work similarly to the skill component(s) 554 implemented by the system component(s). The skill component(s) may correspond to one or more domains that are used in order to determine how to act on a spoken input in a particular way, such as by outputting a directive that corresponds to the determined intent, and which can be processed to implement the desired operation. The skill component(s) installed on the user device 410 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 410 may be in communication with one or more skill system component(s) 425. For example, a skill system component(s) 425 may be located in a remote environment (e.g., separate location) such that the user device 410 may only communicate with the skill system component(s) 425 via the network(s) 499. However, the disclosure is not limited thereto. For example, in at least some embodiments, a skill system component(s) 425 may be configured in a local environment (e.g., home server and/or the like) such that the user device 410 may communicate with the skill system component(s) 425 via a private network, such as a local area network (LAN).

A skill system component(s) 425 may communicate with a skill component(s) 554 within the system component(s) 420 directly with the orchestrator component 530 and/or the action plan execution component 445, or with other components. A skill system component(s) 425 may be configured to perform one or more actions. An ability to perform such action(s) may sometimes be referred to as a "skill." That is, a skill may enable a skill system component(s) 425 to execute specific functionality in order to provide data or perform some other action requested by a user. For example, a weather service skill may enable a skill system component(s) 425 to provide weather information to the system component(s) 420, a car service skill may enable a skill system component(s) 425 to book a trip with respect to a taxi or ride sharing service, an order pizza skill may enable a skill system component(s) 425 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 420 may be configured with a skill component 554 dedicated to interacting with the skill system component(s) 425. Unless expressly stated otherwise, reference to a skill, skill device, or skill component may include a skill component 554 operated by the system component(s) 420 and/or skill operated by the skill system component(s) 425. Moreover, the functionality described herein as a skill or skill may be referred to using many different terms, such as an action, bot, app, or the like. The skill component 554 and or skill system component(s) 425 may return output data to the orchestrator component 530.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 556. The TTS component 556 may generate audio data (e.g., synthesized speech) from text data using one or more different methods. Text data input to the TTS component 556 may come from a skill component 554, the orchestrator component 530, or another component of the system. In one method of synthesis called unit selection, the TTS component 556 matches text data against a database of recorded speech. The TTS component 556 selects matching units of recorded speech and concatenates the units together to form audio data. In another method of synthesis called parametric synthesis, the TTS component 556 varies parameters such as frequency, volume, and noise to create audio data including an artificial speech waveform. Parametric synthesis uses a computerized voice generator, sometimes called a vocoder.

The user device 410 may include still image and/or video capture components such as a camera or cameras to capture one or more images. The user device 410 may include circuitry for digitizing the images and/or video for transmission to the system component(s) 420 as image data. The user device 410 may further include circuitry for voice command-based control of the camera, allowing a user 405 to request capture of image or video data. The user device 410 may process the commands locally or send audio data 511 representing the commands to the system component(s) 420 for processing, after which the system component(s) 420 may return output data that can cause the user device 410 to engage its camera.

The system component(s) 420 may include a user recognition component 595 that recognizes one or more users using a variety of data. The user recognition component 595 may take as input the audio data 511 and/or text data output by the ASR component 550. The user recognition component 595 may perform user recognition by comparing audio characteristics in the audio data 511 to stored audio characteristics of users. The user recognition component 595 may also perform user recognition by comparing biometric data (e.g., fingerprint data, iris data, etc.), received by the system in correlation with the present user input, to stored biometric data of users assuming user permission and previous authorization. The user recognition component 595 may further perform user recognition by comparing image data (e.g., including a representation of at least a feature of a user), received by the system in correlation with the present user input, with stored image data including representations of features of different users. The user recognition component 595 may perform additional user recognition processes, including those known in the art.

The user recognition component 595 determines scores indicating whether user input originated from a particular user. For example, a first score may indicate a likelihood that the user input originated from a first user, a second score may indicate a likelihood that the user input originated from a second user, etc. The user recognition component 595 also determines an overall confidence regarding the accuracy of user recognition operations.

Output of the user recognition component 595 may include a single user identifier corresponding to the most likely user that originated the user input. Alternatively, output of the user recognition component 595 may include an N-best list of user identifiers with respective scores indicating likelihoods of respective users originating the user input. The output of the user recognition component 595 may be used to inform processing of the arbitrator component 582, the orchestrator component 530, and/or the language model orchestrator component 430 as well as processing performed by other components of the system.

The system component(s) 420/user device 410 may include a presence detection component that determines the presence and/or location of one or more users using a variety of data.

The system (either on user device 410, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 570 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 410, the user profile (associated with the presented login information) may be updated to include information about the user device 410, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 570 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 570 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 5 may be illustrated as part of system component(s) 420, user device 410, or otherwise, the components may be arranged in other device(s) (such as in user device 410 if illustrated in system component(s) 420 or vice-versa, or in other device(s) altogether) without departing from the disclosure.

In at least some embodiments, the system component(s) may receive the audio data 511 from the user device 410, to recognize speech corresponding to a spoken input in the received audio data 511, and to perform functions in response to the recognized speech. In at least some embodiments, these functions involve sending directives (e.g., commands), from the system component(s) to the user device 410 (and/or other user devices 410) to cause the user device 410 to perform an action, such as output an audible response to the spoken input via a loudspeaker(s), and/or control secondary devices in the environment by sending a control command to the secondary devices.

Thus, when the user device 410 is able to communicate with the system component(s) over the network(s) 499, some or all of the functions capable of being performed by the system component(s) may be performed by sending one or more directives over the network(s) 499 to the user device 410, which, in turn, may process the directive(s) and perform one or more corresponding actions. For example, the system component(s), using a remote directive that is included in response data (e.g., a remote response), may instruct the user device 410 to output an audible response (e.g., using TTS processing performed by an on-device TTS component) to a user's question via a loudspeaker(s) of (or otherwise associated with) the user device 410, to output content (e.g., music) via the loudspeaker(s) of (or otherwise associated with) the user device 410, to display content on a display of (or otherwise associated with) the user device 410, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 405 as part of a shopping function, establishing a communication session (e.g., a video call) between the user 405 and another user, and so on.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 6:
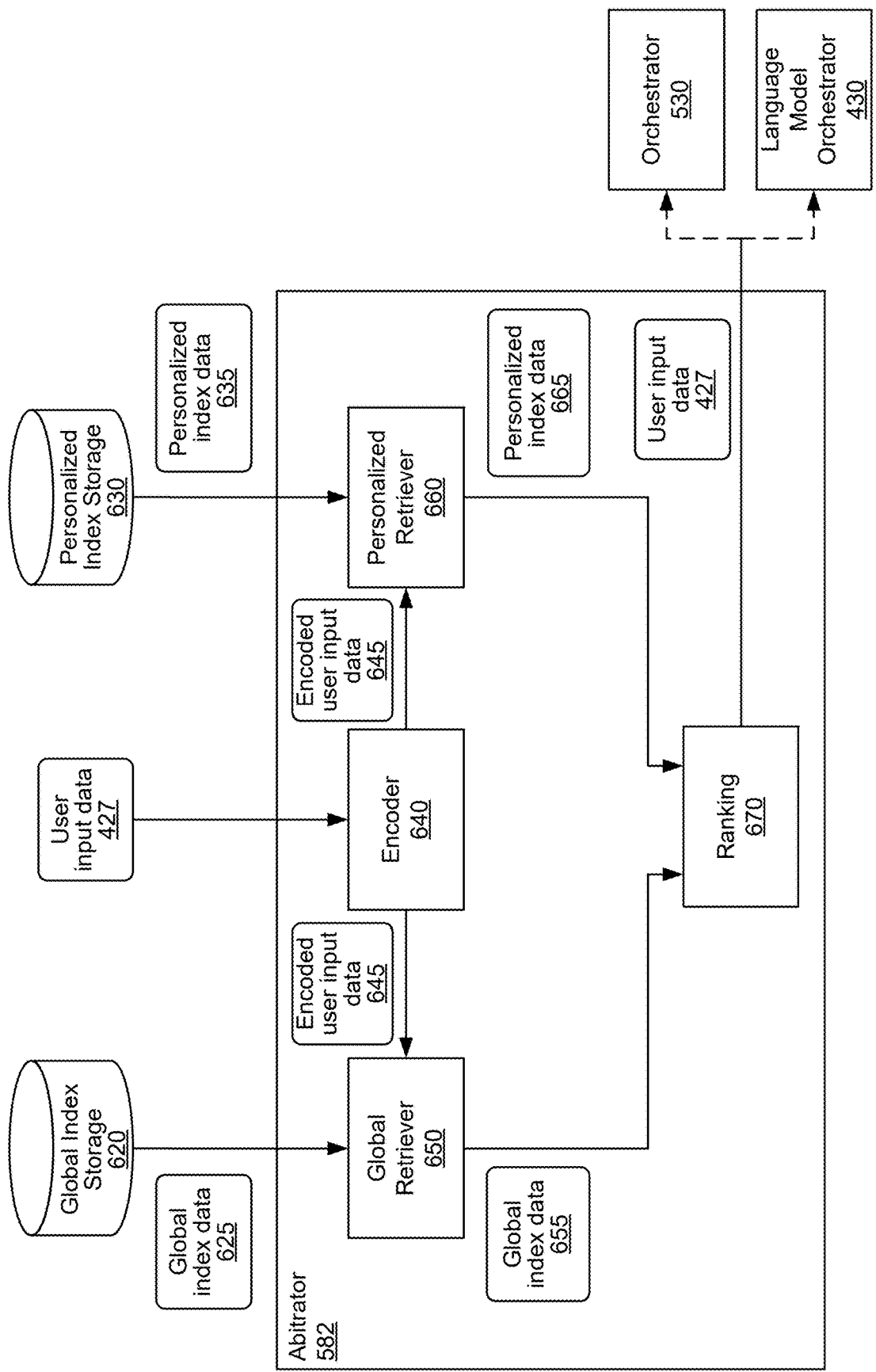
FIG. 6 is a conceptual diagram illustrating example processing of an arbitrator component of the system, according to embodiments of the present disclosure.

FIG. 6 illustrates example components and processing of the arbitrator component 582. As shown in FIG. 6, the arbitrator component 582 may include an encoder component 640, a global retriever component 650, a personalized retriever component 660, and a ranking component 670. The arbitrator component 582 may be in communication with a global index storage 620 and a personalized index storage 630. The arbitrator component 582 may be configured to perform retrieval-based techniques based on a semantic vectorized representation of a user input and historical user inputs received by the system over a period of time (e.g., past 30 days) to determine whether the orchestrator component 530 or the language model orchestrator component 430 or both of them should process with respect to the user input.

The user input data 427 may be received at the encoder component 640 of the arbitrator component 582. The encoder component 640 may process the user input data 427 to generate encoded user input data 645 represented an encoded representation of the user input data 427 (e.g., a vectorized representation of the user input). The encoder component may send the encoded user input data 645 to the global retriever component 650 and the personalized retriever component 660. In some embodiments, the encoder component 640 may be trained using techniques associated with Deep Structured Semantic Models (DSSM).

The global retriever component 650 is configured to determine one or more historical user inputs that are similar to the user input data 427. The global retriever component 650 queries a global index storage 620 for global index data 625 representing one or more historical user inputs that are semantically similar to the user input data 427. The global retriever component 650 may include one or more historical user inputs received from various users over a period of time (e.g., 30 days). In some embodiments, the global index data 625 may correspond to an encoded representation(s) of the historical user input(s). In such embodiments, the one or more historical user inputs that are semantically similar to the user input data 427 may be determined based on comparing the encoded user input data 645 to the encoder representation(s) of the historical user input(s) (e.g., to determine a cosine similarity). The global retriever component 650 may send the global index data 625 to the ranking component 670.

The personalized retriever component 660 is configured to determine one or more historical user inputs that are similar to the user input data 427, where the one or more historical user inputs are associated with the user 405 that provided the user input corresponding to the user input data 427. The personalized retriever component 660 queries a personalized index storage 630 for personalized index data 635 representing one or more historical user inputs that are semantically similar to the user input data 427 and were provided by the same user that provided the user input corresponding to the user input data 427. The personalized retriever component 660 may include one or more historical user inputs received from the user corresponding to the user input data 427 over a period of time (e.g., 30 days). In some embodiments, the personalized index data 635 may correspond to an encoded representation(s) of the historical user input(s). In such embodiments, the one or more historical user inputs that are semantically similar to the user input data 427 may be determined based on comparing the encoded user input data 645 to the encoder representation(s) of the historical user input(s) (e.g., to determine a cosine similarity). The personalized retriever component 660 may send the personalized index data 635 to the ranking component 670.

In some embodiments, the global index storage 620 and/or the personalized index storage 630 may further include metadata associated with the historical user inputs, which may be further included in the global index data 625 and/or the personalized index data 635. For example, the global index storage 620 and/or the personalized index storage 630 may further include a user satisfaction associated with a system-generated response to the user input, a value representing how many times the user input was received during the time period, a domain (e.g., routine, smart home, shopping, weather, etc.), etc.

In some embodiments, the global retriever component 650 and/or the personalized retriever component 660 may retrieve the global index data 625 and/or the personalized index data 635 semantically similar to the encoded user input data 645 using Maximum Inner Product Search Solution.

The ranking component 670 may process the global index data 655 and the personalized index data 665 to determine whether to send the user input data 427 to the orchestrator component 530 and/or the language model orchestrator component 430. In some embodiments, the ranking component 670 may make such a determination based on the metadata included in the global index data 655 and/or the personalized index data 665. In some embodiments, the ranking component 670 may be a rule-based component. In other embodiments, the ranking component 670 may be an ML-based component (e.g., a decision tree, a classifier, an LLM, etc.). In embodiments where the ranking component 670 is a language model (e.g., an LLM), the ranking component 670 may be further configured to determine if there the user input is ambiguous, in which case the ranking component 670 may generate a request for additional information to resolve the ambiguity.

In some embodiments, after determining that the orchestrator component 530 and/or the language model orchestrator component 430 should process with respect to the user input data 427, the ranking component 670 may be configured to periodically determine whether the orchestrator component 530 and/or the language model orchestrator component 430 should continue processing with respect to the user input data 427. For example, after a particular point in the processing of the orchestrator component 530 (e.g., after performing NLU, prior to determining a skill component 554 to process with respect to the user input data 427, prior to performing an action responsive to the user input, etc.) and/or the language model orchestrator component 430 (e.g., after selecting a task to be completed, after receiving the action response data from the one or more components, after completing a task, prior to performing an action responsive to the user input, etc.) the orchestrator component 530 and/or the language model orchestrator component 430 may query the arbitrator component 582 has determined that the orchestrator component 530 and/or the language model orchestrator component 430 should halt processing with respect to the user input data 427. As discussed above, the system may be configured to stream portions of data associated with processing with respect to a user input to the one or more components such that the one or more components may begin performing their configured processing with respect to that data as soon as it is available to the one or more components. As such, the arbitrator component 582 may cause the orchestrator component 530 and/or the language model orchestrator component 430 to begin processing with respect to a user input as soon as a portion of data associated with the user input data 427 is available (e.g., the ASR data, context data, output of the user recognition component 595. Thereafter, once the arbitrator component 582 has enough data to perform the processing described herein above to determine whether the orchestrator component 530 and/or the language model orchestrator component 430 is to process with respect to the user input, the arbitrator component 582 may inform the corresponding component (e.g., the orchestrator component 530 and/or the language model orchestrator component 430) to continue/halt processing with respect to the user input at one of the logical checkpoints in the processing of the orchestrator component 530 and/or the language model orchestrator component 430.

In some embodiments, the orchestrator component 530 and/or the language model orchestrator component 430 may periodically confirm that they are to continue processing with respect to the user input. For example, the arbitrator component 582 may be further configured to periodically receive data generated by the orchestrator component 530 and/or the language model orchestrator component 430 during processing with respect to the user input and determine whether the orchestrator component 530 and/or the language model orchestrator component 430 should continue processing. The arbitrator component 582 may receive such data at logical checkpoints in the processing of the orchestrator component 530 (e.g., after completion of ASR processing, after completion of natural language understanding processing, after selection of a skill component to process with respect to the user input and prior to initiation of processing by the skill component, or prior to the processing of any component discussed herein with respect to the orchestrator component 530.) and/or the language model orchestrator component 430 (e.g., prior to processing of the language model shortlister component 440, prior to beginning processing with respect to a subsequent task, or prior to the processing of any other component discussed herein above with respect to the language model orchestrator component 430). The arbitrator component 582 may be configured to process as described herein above to compare the received data to data associated with processing of a previous user input. This may allow the arbitrator component 582 to make a more informed determination (e.g., based on the additional data determined during processing of the orchestrator component 530 and/or the language model orchestrator component 430) as to which component(s) should process the user input. In some embodiments, the data may be received at another component of the system configured to process as described herein.

In some embodiments, after sending the data to the arbitrator component 582, the orchestrator component 530 and/or the language model orchestrator component 430 may temporarily suspend processing with respect to the user input until they receive data from the arbitrator component 582 confirming that they are to continue processing with respect to the user input. As discussed above, in some embodiments, the language model orchestrator component 430 may send the data to the arbitrator component 582 prior to the processing of the language model shortlister component 440. In some embodiments, the language model orchestrator component 430 may further include a component configured to process the task data output by the task generation component 435 (e.g., the task data 437) to determine whether completion of the current task will result in a real-world action (e.g., a change in the state of a device, such as turning on a light, changing a channel on a television, changing a temperature value on a thermostat, locking a door, etc.). If the component determines that completion of the current task will result in a real-world action, then the language model orchestrator component 430 may temporarily suspend its processing prior to the processing of the language model shortlister component 440. If the component determines that completion of the current task will not result in a real-world action, then the language model orchestrator component 430 may begin processing of the language model shortlister component 440, rather than temporarily suspending processing. In some embodiments, the orchestrator component 530 may include a similarly configured component.

Figure 7:
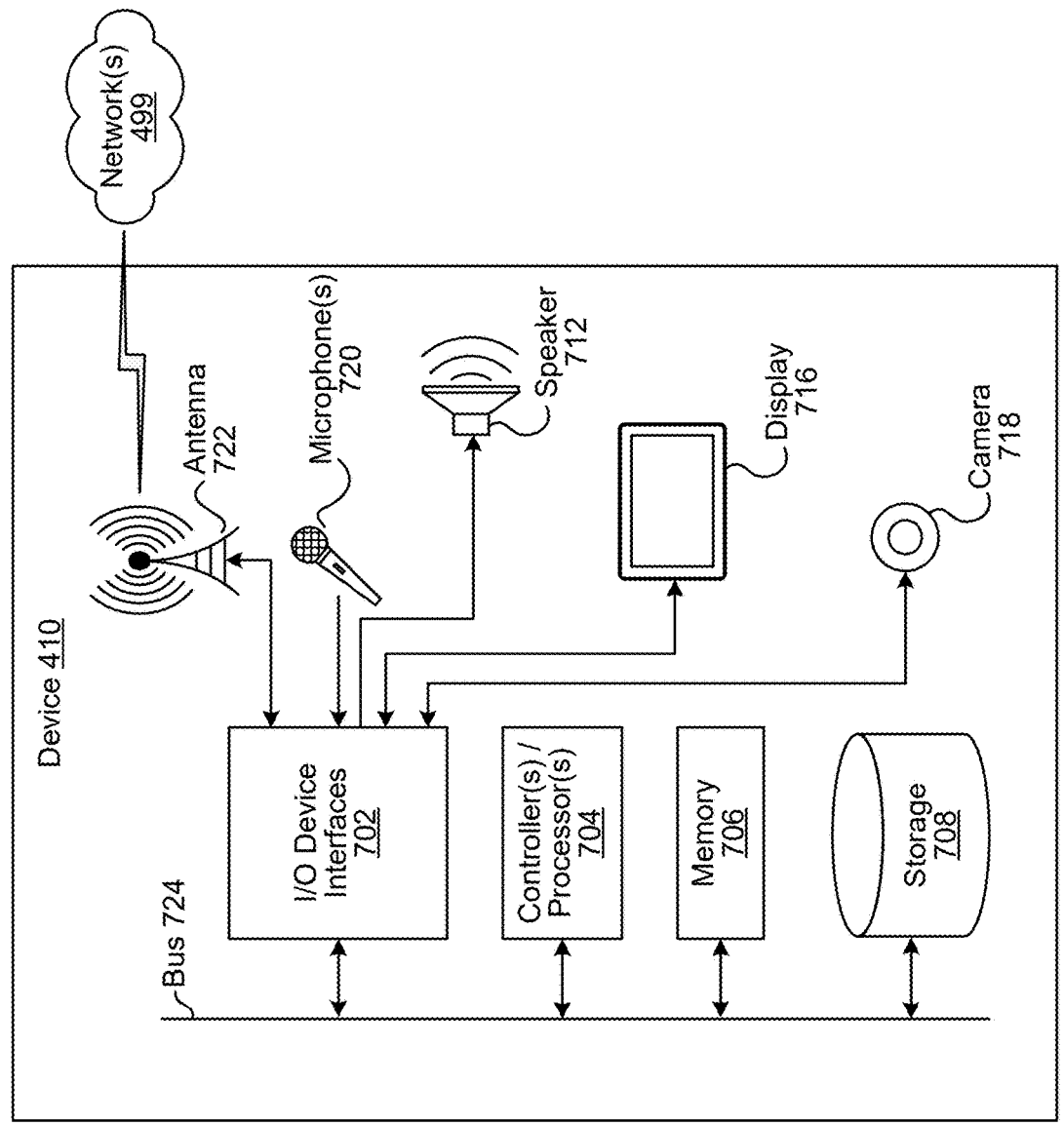
FIG. 7 is a block diagram conceptually illustrating example components of a device, according to embodiments of the present disclosure.
Figure 8:
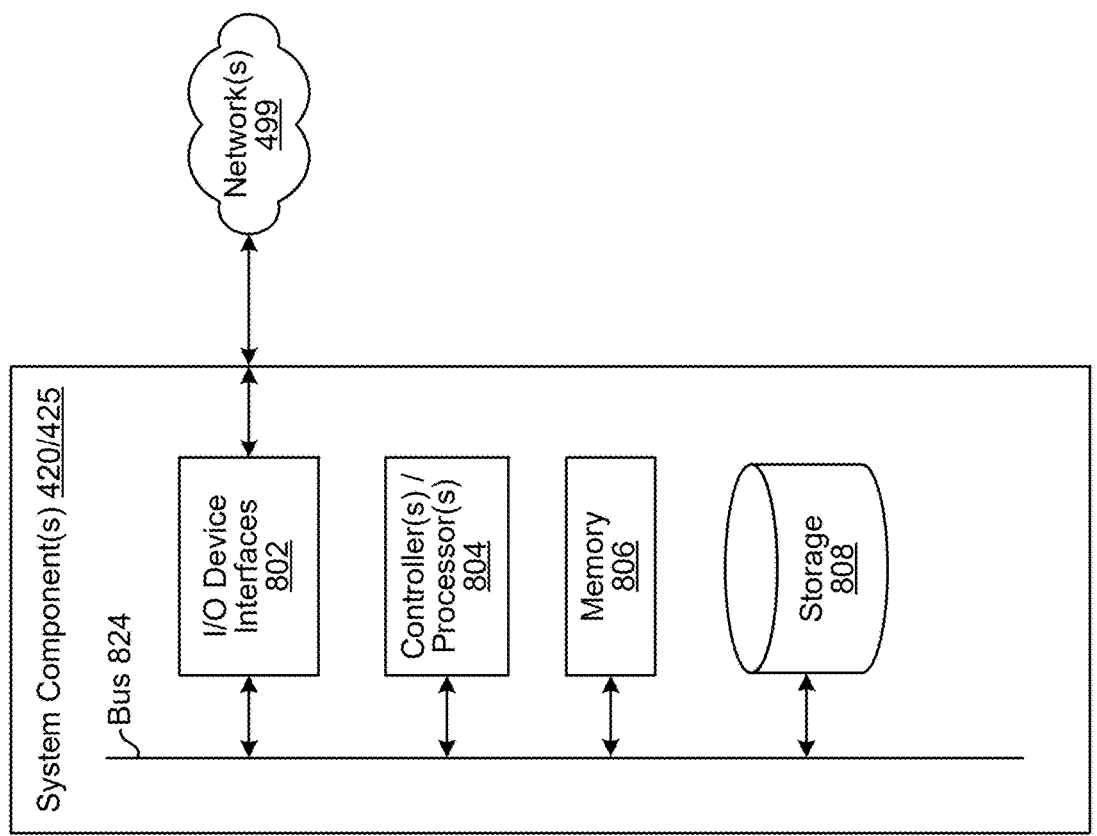
FIG. 8 is a block diagram conceptually illustrating example components of a system, according to embodiments of the present disclosure.

FIG. 7 is a block diagram conceptually illustrating a user device 410 that may be used with the system. FIG. 8 is a block diagram conceptually illustrating example components of a remote device, such as the natural language command processing system component(s), which may assist with ASR processing, NLU processing, etc., and a skill system component(s) 425. System component(s) (420/425) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the user device 410 may operate locally to a user (e.g., within a same environment so the device may receive inputs and playback outputs for the user) the server/system component(s) may be located remotely from the user device 410 as its operations may not require proximity to the user. The server/system component(s) may be located in an entirely different location from the user device 410 (for example, as part of a cloud computing system or the like) or may be located in a same environment as the user device 410 but physically separated therefrom (for example a home server or similar device that resides in a user's home or business but perhaps in a closet, basement, attic, or the like). The system component(s) 420 may also be a version of a user device 410 that includes different (e.g., more) processing capabilities than other user device(s) 410 in a home/office. One benefit to the server/system component(s) being in a user's home/business is that data used to process a command/return a response may be kept within the user's home, thus reducing potential privacy concerns.

Multiple system components (420/425) may be included in the overall system of the present disclosure, such as one or more natural language processing system component(s) 420 for performing ASR processing, one or more natural language processing system component(s) 420 for performing NLU processing, one or more skill system component(s) 425, etc. In operation, each of these systems may include computer-readable and computer-executable instructions that reside on the respective device (420/425), as will be discussed further below.

Each of these devices (410/420/425) may include one or more controllers/processors (704/804), which may each include a central processing unit (CPU) for processing data and computer-readable instructions, and a memory (706/806) for storing data and instructions of the respective device. The memories (706/806) may individually include volatile random-access memory (RAM), non-volatile read only memory (ROM), non-volatile magnetoresistive memory (MRAM), and/or other types of memory. Each device (410/420/425) may also include a data storage component (708/808) for storing data and controller/processor-executable instructions. Each data storage component (708/808) may individually include one or more non-volatile storage types such as magnetic storage, optical storage, solid-state storage, etc. Each device (410/420/425) may also be connected to removable or external non-volatile memory and/or storage (such as a removable memory card, memory key drive, networked storage, etc.) through respective input/output device interfaces (702/802).

Computer instructions for operating each device (410/420/425) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (410/420/425) includes input/output device interfaces (702/802). A variety of components may be connected through the input/output device interfaces (702/802), as will be discussed further below. Additionally, each device (410/420/425) may include an address/data bus (724/824) for conveying data among components of the respective device. Each component within a device (410/420/425) may also be directly connected to other components in addition to (or instead of) being connected to other components across the bus (724/824).

Referring to FIG. 7, the user device 410 may include input/output device interfaces 702 that connect to a variety of components such as an audio output component such as a speaker 712, a wired headset or a wireless headset (not illustrated), or other component capable of outputting audio. The user device 410 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 410 may additionally include a display 716 for displaying content. The user device 410 may further include a camera 718.

Via antenna(s) 722, the input/output device interfaces 702 may connect to one or more networks 499 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 499, the system may be distributed across a networked environment. The I/O device interface (702/802) may also include communication components that allow data to be exchanged between devices such as different physical servers in a collection of servers or other components.

The components of the user device(s) 410, the natural language command processing system component(s), or a skill system component(s) 425 may include their own dedicated processors, memory, and/or storage. Alternatively, one or more of the components of the user device(s) 410, the natural language command processing system component(s), or a skill system component(s) 425 may utilize the I/O interfaces (702/802), processor(s) (704/804), memory (706/806), and/or storage (708/808) of the user device(s) 410, natural language command processing system component(s), or the skill system component(s) 425, respectively. Thus, the ASR component 550 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 410, the natural language command processing system component(s), and a skill system component(s) 425, as described herein, are illustrative, and may be located as a stand-alone device or may be included, in whole or in part, as a component of a larger device or system. As can be appreciated, a number of components may exist either on a system component(s) and/or on user device 410. For example, ASR component 550/XXE50 and TTS component XXK80/XXE80), etc., for example as illustrated in FIGS. 5 and XXE. Unless expressly noted otherwise, the system version of such components may operate similarly to the device version of such components and thus the description of one version (e.g., the system version or the local version) applies to the description of the other version (e.g., the local version or system version) and vice-versa.

Figure 9:
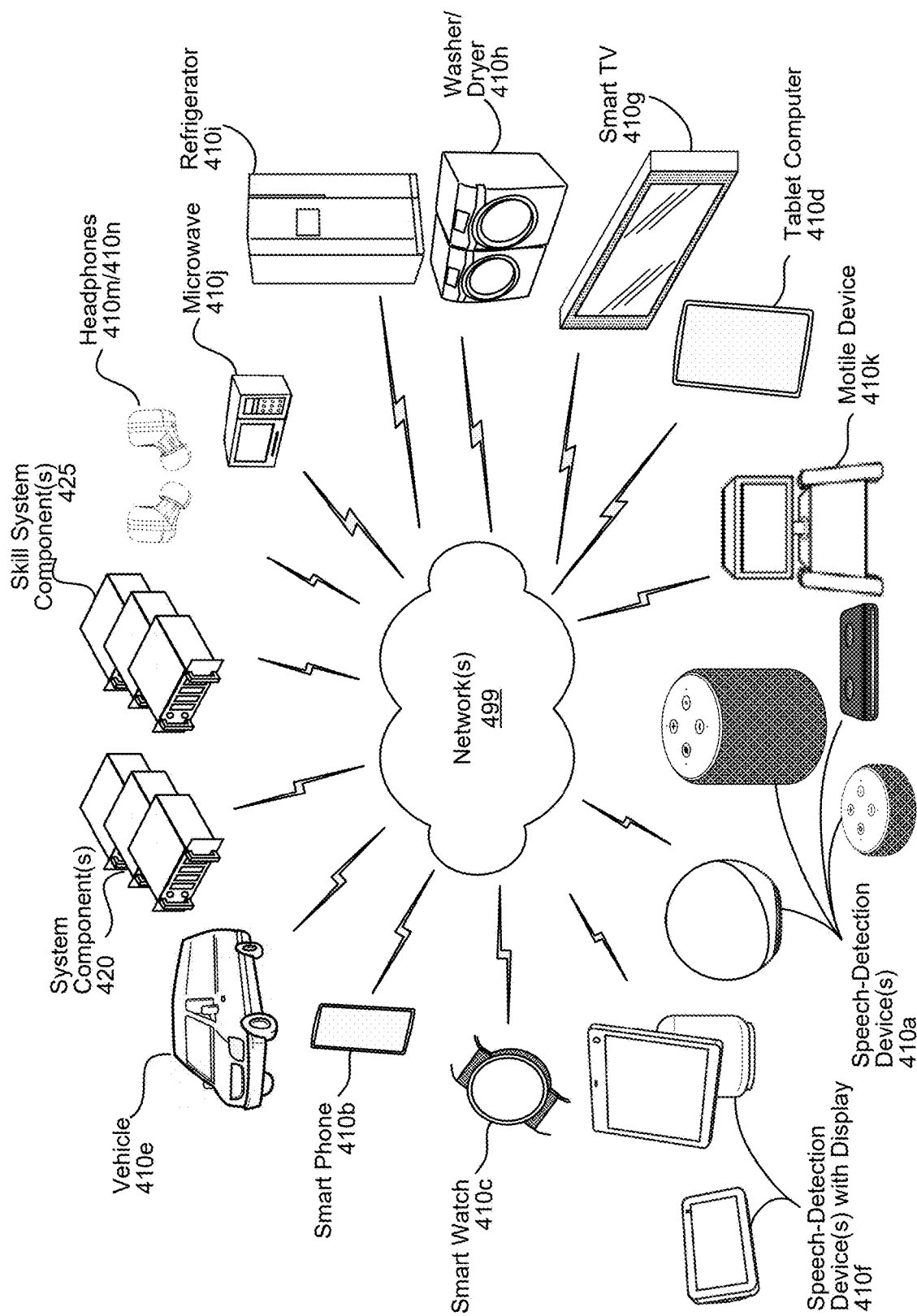
FIG. 9 illustrates an example of a network for use with the overall system, according to embodiments of the present disclosure.

As illustrated in FIG. 9, multiple devices (410a-410n, 420, 425) may contain components of the system and the devices may be connected over a network(s) 499. The network(s) 499 may include a local or private network or may include a wide network such as the Internet. Devices may be connected to the network(s) 499 through either wired or wireless connections. For example, a speech-detection user device 410a, a smart phone 410b, a smart watch 410c, a tablet computer 410d, a vehicle 410e, a speech-detection device with display 410f, a display/smart television 410g, a washer/dryer 410h, a refrigerator 410i, a microwave 410j, autonomously motile user device 410k (e.g., a robot), etc., may be connected to the network(s) 499 through a wireless service provider, over a Wi-Fi or cellular network connection, or the like. Other devices are included as network-connected support devices, such as the natural language command processing system component(s) 420, the skill system component(s) 425, and/or others. The support devices may connect to the network(s) 499 through a wired connection or wireless connection. Networked devices may capture audio using one-or-more built-in or connected microphones or other audio capture devices, with processing performed by ASR components, NLU components, or other components of the same device or another device connected via the network(s) 499, such as the ASR component 550, etc. of the natural language command processing system component(s) 420.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash memory, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving system usage data associated with a user identifier, the system usage data being based on past system interactions associated with the user identifier;
   receiving supplemental content presentation data including supplemental content and indicating how the supplemental content is to be presented;
   determining first embedding data representing the system usage data;
   determining second embedding data representing the supplemental content presentation data;
   receiving dialog data associated with the user identifier, the dialog data comprising a user input and a system response to the user input;
   receiving supplemental content data corresponding to the supplemental content;
   determining, using a language model, third embedding data representing the user input;
   determining, using the language model, fourth embedding data representing the system response;
   determining, using the language model, fifth embedding data representing the supplemental content data;
   determining a pairwise dot product using the first embedding data, the second embedding data, the third embedding data, the fourth embedding data, and the fifth embedding data;

generating model input data by concatenating the pairwise dot product with the first embedding data, the second embedding data, the third embedding data, the fourth embedding data, and the fifth embedding data;
processing, using a second model, the model input data to determine the supplemental content is to be presented; and
presenting the supplemental content.

2. The computer-implemented method of claim 1, wherein receiving the system usage data comprises one or more of:
  receiving conversion data representing when past supplemental content was presented using the user identifier and resulted in a subsequent user input relating to the past supplemental content;
  receiving subscription data representing the user identifier is associated with one or more subscriptions to access system functionality; and
  receiving domain affinity data representing a user preference for a domain, corresponding to the supplemental content, based on past user inputs associated with the user identifier.

3. The computer-implemented method of claim 1, further comprising:
  receiving time data representing a present time;
  receiving device type data corresponding to a device to be used to present the supplemental content;
  determining sixth embedding data representing the time data;
  determining seventh embedding data representing the device type data; and
  determining the pairwise dot product further using the sixth embedding data and the seventh embedding data.

4. The computer-implemented method of claim 1, wherein:
  the system usage data is represented as numerical values; and
  determining the first embedding data comprises processing the numerical values using a multilayer perceptron network.

5. A computer-implemented method comprising:
  receiving usage data associated with a user identifier;
  receiving supplemental data including supplemental content and indicating how the supplemental content is to be presented;
  determining first embedding data representing the usage data;
  determining second embedding data representing the supplemental data;
  receiving input data associated with the user identifier, the input data representing a user input;
  receiving response data representing a system response to the user input;
  receiving supplemental content data corresponding to the supplemental content;
  determining, using a language model, third embedding data representing the input data;
  determining, using the language model, fourth embedding data representing the response data;
  determining, using the language model, fifth embedding data representing the supplemental content data;
  determining a model input data using the first embedding data, the second embedding data, the third embedding data, the fourth embedding data, and the fifth embedding data;
  processing, using a second model, the model input data to determine the supplemental content is to be presented; and
  presenting the supplemental content.

6. The computer-implemented method of claim 5, further comprising:
  determining a pairwise dot product using the first embedding data, the second embedding data, the third embedding data, the fourth embedding data, and the fifth embedding data; and
  generating the model input data using the pairwise dot product, the first embedding data, and the second embedding data.

7. The computer-implemented method of claim 5, further comprising:
  determining a pairwise dot product using the first embedding data, the second embedding data, the third embedding data, the fourth embedding data, and the fifth embedding data; and
  generating the model input data using the pairwise dot product, the third embedding data, the fourth embedding data, and the fifth embedding data.

8. The computer-implemented method of claim 5, further comprising:
  determining a pairwise dot product using the first embedding data, the second embedding data, the third embedding data, the fourth embedding data, and the fifth embedding data; and
  generating the model input data using the pairwise dot product, the first embedding data, the second embedding data, the third embedding data, the fourth embedding data, and the fifth embedding data.

9. The computer-implemented method of claim 5, wherein receiving the usage data comprises one or more of:
  receiving conversion data representing when past supplemental content was presented using the user identifier and resulted in a subsequent user input relating to the past supplemental content;
  receiving subscription data representing the user identifier is associated with one or more subscriptions to access system functionality; and
  receiving domain affinity data representing a user preference for a domain, corresponding to the supplemental content, based on past user inputs associated with the user identifier.

10. The computer-implemented method of claim 5, further comprising:
  receiving time data representing a present time;
  determining sixth embedding data representing the time data; and
  determining the model input data further using the sixth embedding data.

11. The computer-implemented method of claim 5, further comprising:
  receiving device type data corresponding to a device to be used to present the supplemental content;
  determining sixth embedding data representing the device type data; and
  determining the model input data further using the sixth embedding data.

12. The computer-implemented method of claim 5, wherein:
  the usage data is represented as numerical values; and
  determining the first embedding data comprises processing the numerical values using a multilayer perceptron network.

13. A computing system comprising:
at least one processor; and
at least one memory comprising instructions that, when executed by the at least one processor, cause the computing system to:
receive usage data associated with a user identifier;
receive supplemental data including supplemental content and indicating how the supplemental content is to be presented;
determine first embedding data representing the usage data;
determine second embedding data representing the supplemental data;
receive input data associated with the user identifier, the input data representing a user input;
receive response data representing a system response to the user input;
receive supplemental content data corresponding to the supplemental content;
determine, using a language model, third embedding data representing the input data;
determine, using the language model, fourth embedding data representing the response data;
determine, using the language model, fifth embedding data representing the supplemental content data;
determine model input data using the first embedding data, the second embedding data, the third embedding data, the fourth embedding data, and the fifth embedding data;
process, using a second model, the model input data to determine the supplemental content is to be presented; and
present the supplemental content.

14. The computing system of claim 13, wherein the at least one memory further comprises instructions that, when executed by the at least one processor, further cause the computing system to:
determine a pairwise dot product using the first embedding data, the second embedding data, the third embedding data, the fourth embedding data, and the fifth embedding data; and
generate the model input data using the pairwise dot product, the first embedding data, and the second embedding data.

15. The computing system of claim 13, wherein the at least one memory further comprises instructions that, when executed by the at least one processor, further cause the computing system to:
determine a pairwise dot product using the first embedding data, the second embedding data, the third embedding data, the fourth embedding data, and the fifth embedding data; and
generate the model input data using the pairwise dot product, the third embedding data, the fourth embedding data, and the fifth embedding data.

16. The computing system of claim 13, wherein the at least one memory further comprises instructions that, when executed by the at least one processor, further cause the computing system to:
determine a pairwise dot product using the first embedding data, the second embedding data, the third embedding data, the fourth embedding data, and the fifth embedding data; and
generate the model input data using the pairwise dot product, the first embedding data, the second embedding data, the third embedding data, the fourth embedding data, and the fifth embedding data.

17. The computing system of claim 13, wherein the usage data comprises one or more of:
conversion data representing when past supplemental content was presented using the user identifier and resulted in a subsequent user input relating to the past supplemental content;
subscription data representing the user identifier is associated with one or more subscriptions to access system functionality; and
domain affinity data representing a user preference for a domain, corresponding to the supplemental content, based on past user inputs associated with the user identifier.

18. The computing system of claim 13, wherein the at least one memory further comprises instructions that, when executed by the at least one processor, further cause the computing system to:
receive time data representing a present time;
determine sixth embedding data representing the time data; and
determine the model input data further using the sixth embedding data.

19. The computing system of claim 13, wherein the at least one memory further comprises instructions that, when executed by the at least one processor, further cause the computing system to:
receive device type data corresponding to a device to be used to present the supplemental content;
determine sixth embedding data representing the device type data; and
determine the model input data further using the sixth embedding data.

20. The computing system of claim 13, wherein:
the usage data is represented as numerical values; and
the instructions that cause the computing system to determine the first embedding data further comprise instructions that, when executed by the at least one processor, cause the computing system to determine the first embedding data by processing the numerical values using a multilayer perceptron network.

* * * * *